United States Patent
Krishnakumar et al.

(10) Patent No.: US 9,690,400 B2
(45) Date of Patent: Jun. 27, 2017

(54) INFORMATION HANDLING SYSTEM INTERACTIVE TOTEMS

(71) Applicant: Dell Products L.P., Round Rock, TX (US)

(72) Inventors: Karthik Krishnakumar, Round Rock, TX (US); Rocco Ancona, Austin, TX (US); Michiel Sebastiaan Emanuel Petrus Knoppert, Amsterdam (NL); Mark R. Ligameri, Lakeway, TX (US); Daniel Acevedo, Austin, TX (US); John T. Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/691,833

(22) Filed: Apr. 21, 2015

(65) Prior Publication Data

US 2016/0313816 A1    Oct. 27, 2016

(51) Int. Cl.

| | |
|---|---|
| G06F 3/0354 | (2013.01) |
| G06F 3/0488 | (2013.01) |
| G06F 3/0338 | (2013.01) |
| G06F 3/038 | (2013.01) |
| G06F 3/01 | (2006.01) |
| G06F 3/041 | (2006.01) |
| G06F 3/042 | (2006.01) |

(52) U.S. Cl.
CPC .......... *G06F 3/03547* (2013.01); *G06F 3/017* (2013.01); *G06F 3/038* (2013.01); *G06F 3/0338* (2013.01); *G06F 3/0418* (2013.01); *G06F 3/0425* (2013.01); *G06F 3/0488* (2013.01); *G06F 3/04883* (2013.01)

(58) Field of Classification Search
CPC ...... G06F 3/03547; G06F 3/165; G06F 3/038; G06F 3/04883; G06F 3/0338; G06F 3/005

See application file for complete search history.

(56) References Cited

U.S. PATENT DOCUMENTS

| | | |
|---|---|---|
| 6,614,422 B1 | 9/2003 | Rafii et al. |
| 8,958,158 B1 | 2/2015 | Raffle et al. |
| 2004/0100479 A1 | 5/2004 | Nakano et al. |
| 2005/0024606 A1 | 2/2005 | Li et al. |
| 2005/0281475 A1 | 12/2005 | Wilson |
| 2007/0058879 A1 | 3/2007 | Cutler et al. |
| 2009/0077504 A1 | 3/2009 | Bell et al. |
| 2009/0184962 A1 | 7/2009 | Kuriakose et al. |
| 2009/0278871 A1 | 11/2009 | Lewis et al. |
| 2009/0295712 A1 | 12/2009 | Ritzau |

(Continued)

*Primary Examiner* — Liliana Cerullo

(74) *Attorney, Agent, or Firm* — Terrile, Cannatti, Chambers & Holland, LLP; Robert W. Holland

(57) ABSTRACT

A totem device accepts inputs from an end user and communicates the inputs to an information handling system through a capacitive mat by moving an interactive portion of the totem relative to a main portion. In one embodiment, the capacitive mat integrates a display that presents input images proximate the totem, such as a volume gauge or mouse keys. Interactive portions include compressible materials that alter surface area pressed against a capacitive mat when pressed upon and plungers that move independent of a main body to press. In one embodiment, a camera captures images of the totem to enhance the distinguishing of inputs.

8 Claims, 28 Drawing Sheets

(56) References Cited

U.S. PATENT DOCUMENTS

| | | |
|---|---|---|
| 2010/0079369 A1 | 4/2010 | Hartmann et al. |
| 2011/0157056 A1* | 6/2011 | Karpfinger ............ G06F 3/0202 345/173 |
| 2011/0181523 A1 | 7/2011 | Grothe et al. |
| 2011/0304580 A1 | 12/2011 | Wu et al. |
| 2012/0035934 A1 | 2/2012 | Cunningham |
| 2012/0089348 A1* | 4/2012 | Perlin ..................... G06F 3/005 702/41 |
| 2012/0194457 A1* | 8/2012 | Cannon .................. G06F 3/011 345/173 |
| 2013/0285901 A1 | 10/2013 | Lee et al. |
| 2014/0043289 A1 | 2/2014 | Stern |
| 2014/0051484 A1 | 2/2014 | Hunt et al. |
| 2014/0168132 A1* | 6/2014 | Graig ...................... G06F 3/044 345/174 |
| 2014/0210748 A1* | 7/2014 | Narita .................. G06F 3/0354 345/173 |
| 2014/0267866 A1 | 9/2014 | Short et al. |
| 2014/0327628 A1 | 11/2014 | Tijssen et al. |
| 2015/0097803 A1 | 4/2015 | Leigh et al. |
| 2015/0248235 A1* | 9/2015 | Offenberg ........... G06F 3/04886 715/773 |
| 2015/0268773 A1 | 9/2015 | Sanaullah et al. |
| 2015/0379964 A1 | 12/2015 | Lee et al. |
| 2016/0054905 A1 | 2/2016 | Chai et al. |
| 2016/0063762 A1 | 3/2016 | Heuvel et al. |
| 2016/0126779 A1 | 5/2016 | Park |
| 2016/0179245 A1 | 6/2016 | Johansson et al. |
| 2016/0378258 A1 | 12/2016 | Lyons et al. |

\* cited by examiner

INFORMATION HANDLING SYSTEM INTERACTIVE TOTEMS

BACKGROUND OF THE INVENTION

Field of the Invention

The present invention relates in general to the field of information handling system end user interaction management, and more particularly to an information handling system immersed user environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Conventional information handling system interactions are managed with a keyboard and mouse. An end user indicates with a mouse which application should receive inputs by activating an application with a mouse click, and then inputs information to the application with the keyboard. Over time, various input and output devices have developed to enhance end user interactions with an information handling system, however, newer input and output devices generally have modified existing I/O device functionality. One example is the use of wireless technology to free the keyboard and mouse from wired connections with an information handling system. Another example is the use of a touchscreen display to accept mouse and keyboard inputs with touches to visual information presented at the display, such as a keyboard or an application graphical user interface. Another example is the use of projected user interfaces that are presented at a projection surface and that have interactions tracked with a camera. For instance, a keyboard projected on a desktop surface accepts user inputs to projected keys instead of physical keys. Structured infrared light projected over the desktop aids the camera in detecting inputs at keys by reflected infrared light that results when an input is made at a key. Each of these input and output devices work independently from each other based upon an end user election to interact with an information handling system using a particular input or output device. Essentially, the end user may as well pick from among different available conventional keyboards or mice.

Conventional end user information handling system interactions offer end users a take-it-or-leave-it option when selecting peripherals to interact with the information handling system. End users often find that their optimal I/O configuration depends upon the context in which the end user is operating. Contextual factors include the location of the user and information handling system, the applications and tasks performed by the end user, the available peripheral devices, the environmental conditions, etc. . . . . As the number of available peripherals, the mobility of information handling systems and the complexity of information handling system tasks have increased over time, the selection of appropriate I/O devices by end users has become more complex. Even when an end user selects a particular I/O device configuration, changes in the context can often change quickly resulting in less optimal interactions. Further, selection of a particular I/O resource often discounts or ignores the availability of other I/O resources to aid in the operation of selected I/O resources. Independent and uncoordinated inputs and outputs at an information handling system sometimes results in a degraded user experience and underutilization of available resources

SUMMARY OF THE INVENTION

Therefore a need has arisen for a system and method which immerses an end user in an information handling system user environment adapted to the end user's context and processing needs.

In accordance with the present invention, a system and method are provided which substantially reduce the disadvantages and problems associated with previous methods and systems for end user interactions with an information handling system. Input and output devices coordinate their functionality to immerse an end user in an immersed information handling system environment adapted to the end user's context and available processing resources. A cooperative approach between I/O devices leads an information handling system to react to an end user's processing needs rather than forcing the end user to react as context, resources and processing needs change.

More specifically, an immersed information handling system environment presents user interfaces to the end user adapted for the end user's position relative to a work area, such as desktop. For example, projected user interfaces are presented in a multi-workspace arc that highlights projected information for a user based on the user's natural reach characteristics and detected position. End user interactions with a projected user interface as well as displayed user interfaces are more accurately tracked in a more efficient manner by coordinating detection of end user interactions by visual or structured light captured by a camera, touches capture by a desktop capacitive sensor and images presented by plural display devices all relative to a common coordinate system, such as a Cartesian coordinate system defined relative to a desktop surface and a polar coordinate system defined relative to a user and the user's detected reach characteristics. Examples of more accurate and efficient input detections include multiple input device tracking of touches made by an end user and manipulations by an end user at physical totem devices. The user's preferences are tracked over time to provide automated selection of peripherals, applications, active input devices, active input applications and windows, etc. . . . . Resources and power consumption management at the immersed information handling system environment provide accurate tracking of end user interactions by selectively engaging resources as needed, such as by activating sensors as disambiguation of intended and unintended inputs becomes an increased priority.

The present invention provides a number of important technical advantages. One example of an important technical advantage is that the immersed information handling system environment provides the user with an improved experience that adapts and reacts to the user's needs instead of waiting for the user to command a desired input and output environment. The end user interacts in a natural manner with multiple sensor devices detecting context that the information handling system applies to create the immersed environment. Active management of processing resources to select input and output devices conserves processing resources for needed tasks to provide a more natural and quicker-reacting user interface and also conserves power consumption. End users are able to focus on the processing tasks that the end user needs to accomplish rather than on the interactions that the end user has to make at an information handling system to perform the processing tasks.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system immersed environment coordinates user interactions across multiple input and output devices for more effective user management of information. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
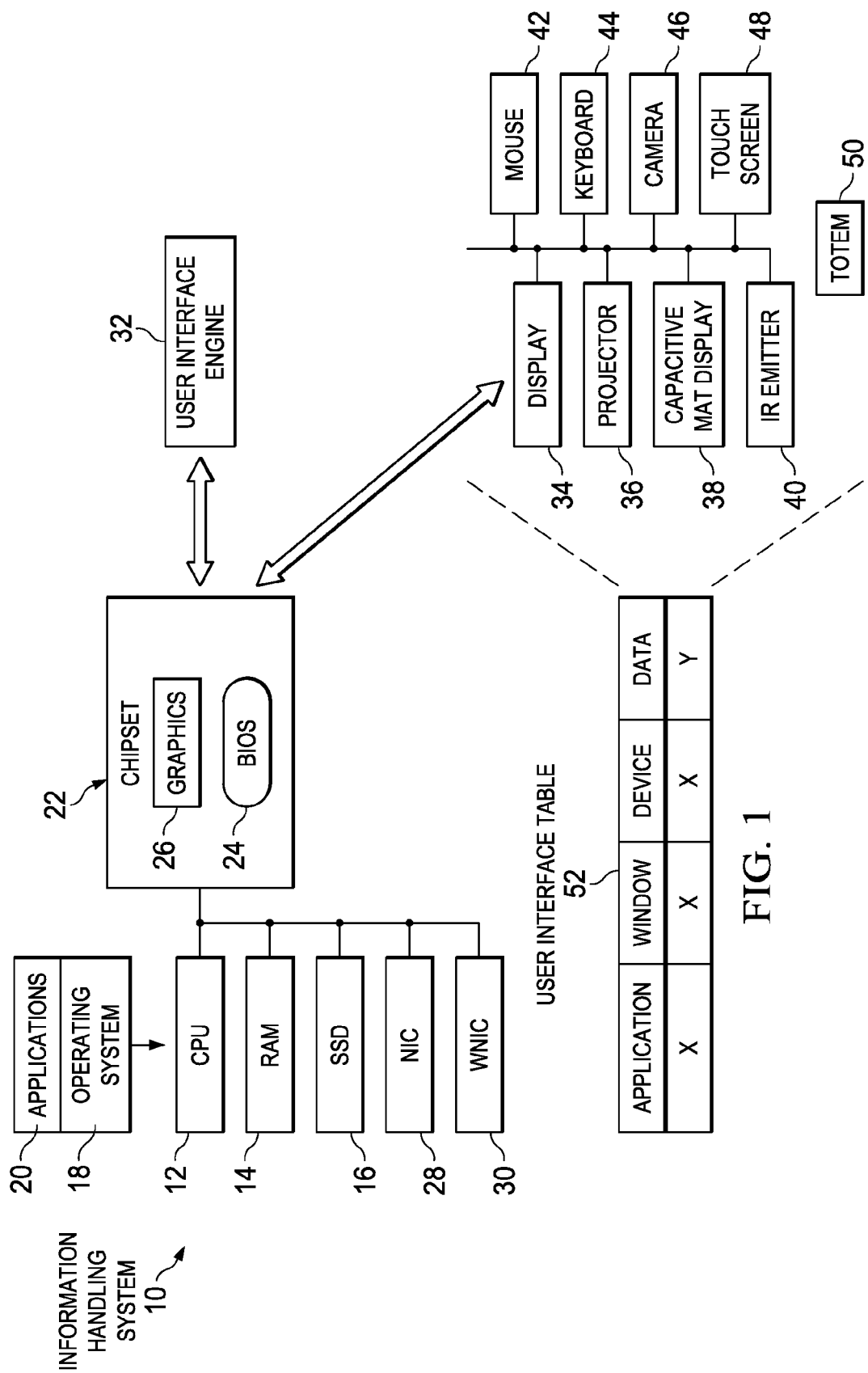
FIG. 1 depicts a block diagram of an information handling system configured to interact with an end user in an immersed environment.

Referring now to FIG. 1, a block diagram depicts an information handling system 10 configured to interact with an end user in an immersed environment. Information handling system 10 processes information with one or more central processor units (CPU's) 12 that execute instructions stored in memory, such as random access memory (RAM) 14. For example, non-volatile memory, such as solid state drive (SSD) 16 or a hard disk drive, stores an operating system 18 that is retrieved to RAM 14 to execute on CPU 12 for supporting applications 20 that generate and modify information in RAM 14 for presentation to an end user. Operating system 18 is bootstrapped to an operational state with firmware instructions stored and executed in a chipset 22, such as a basic input/output system (BIOS) 24. Chipset 22 includes processing components and firmware instructions to support end user interactions with CPU 12 through input and output devices. For example, chipset 22 includes or interfaces with a graphics system 26 that processes visual information into pixel data for presentation at a display device. Firmware on chipset 22 also coordinates communications with external devices and networks, such as with a network interface card (NIC) 28 that couples to an Ethernet interface and a wireless NIC (WNIC) 30 that wireless communicates through wireless local area networks (WLAN) such as 802.11 b, g, n and ac networks, through wireless personal area networks (WPAN) such as Bluetooth or 802.11 ad networks. Although the block diagram of information handling system 10 does not indicate a particular form factor, the immersed end user environment described herein may be supported with a variety of form factors including desktop, portable, tablet, smartphone or other types of information handling systems.

Information handling system 10 creates an end user immersed environment by managing the presentation of information and acceptance of inputs through a user interface engine 32, such as instructions executing in one or more of CPU 12, chipset 22 and individual input and output components like those described below. A display 34 interfaces with graphics system 26 to receive pixel information that is presented as visual images. Display 34 may be configured as an integrated device, such as in a tablet, laptop or convertible information handling system, or as a peripheral device coupled through a cable or wireless interface. Projector 36 is, for example, essentially a display device that projects pixel information against a projection surface, such as a desktop surface. A capacitive mat display 38 is a flat peripheral that rests on a surface, such as a desktop, to present visual information to an end user and to accept inputs from the end user with integrated capacitive touch sensors. An infrared emitter 40 projects infrared light to aid in touch detection and/or resolution of three dimensional images captured by a camera 46. For example, infrared emitter 40 projects an IR curtain just above a surface to detect touches at the surface that pass through the IR curtain. As another example, infrared emitter 40 projects structured light that does not disrupt the end user but provides camera 46 with depth information that aids analysis of images to detect body parts, such as fingers and hands, and dimensions. User interface engine 32 manages inputs and outputs to other types of devices, including a mouse 42, keyboard 44, camera 46 and touchscreen 48. User interface engine 32 applies images captured by camera 46 with and without enhancements by infrared emitter 40 to manage passive input devices, such as totems 50 that an end user manipulates to indicate an input. User interface engine 32 tracks input and output devices relative to applications, windows and content data with a user interface table 52 that allows rapid transitions of presented content between available output devices.

Capacitive mat display 38 offers a physical device in the immersed desktop environment that provides input, output and/or relative location orientation with a flexible, powerful and non-intrusive tool. Capacitive mat display 38 has a thin, flat construction with a base that rests on a desktop and an upper capacitive surface that accepts end user inputs as touches. When presenting visual images with a display, the touch surface of capacitive mat display 38 allows an end user to interact with displayed images in a manner similar to conventional LCD touchscreens. In some embodiments, capacitive mat display 38 may be used without presenting visual images or may include only a capacitive touch surface without including a display. When setup as only a touch surface, capacitive mat display 38 may accept end user inputs made to projected visual images or end user inputs made to visual images presented at other conventional display devices. For example, projector 36 presents visual images for projection at a capacitive surface so that end user touches at the capacitive surface are accepted as inputs to the projected images. Projector 36 aligns the projection of visual images based upon the position of a capacitive touch surface as detected by camera 46 and continuously aligns touch inputs as set forth in greater detail below. Whether or not capacitive mat display 38 includes a display device or has the display device enabled, the capacitive touch sensor surface is available to leveraged as an input device as set forth below.

Figure 2:
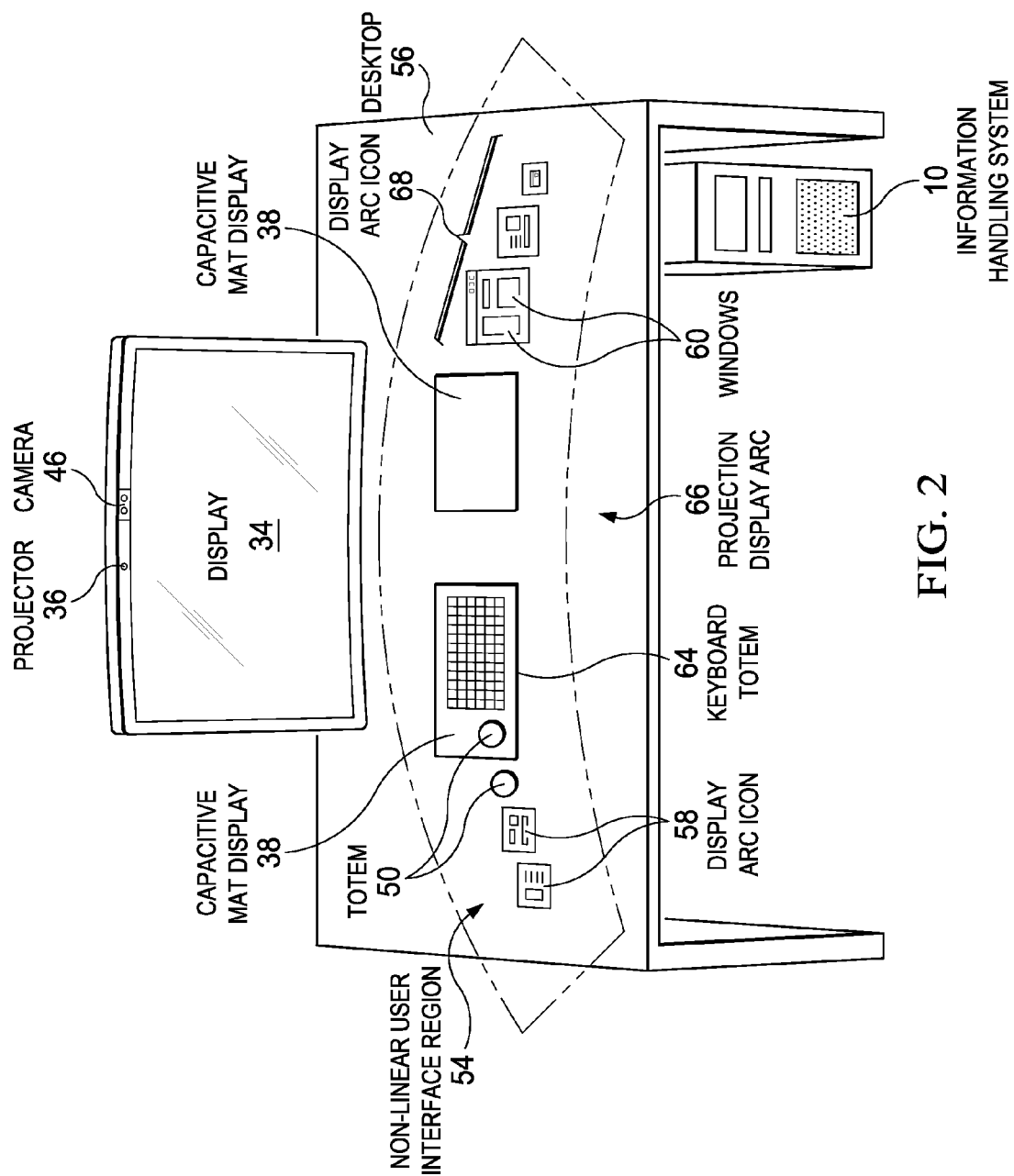
FIG. 2 depicts an upper perspective view of an information handling system that generates an immersed end user environment having a non-linear display configuration.

Referring now to FIG. 2, an upper perspective view depicts an information handling system that generates an immersed end user environment having a non-linear display configuration. Conventional user interfaces generally present visual information in a Cartesian based coordinate system having a rectangular configuration. In larger immersed end user environments that include horizontal input devices, such as capacitive mat display 38, the natural motion of a human arm follows more of an arc pattern, or more precisely, a dual arc rotating about each shoulder and centered at the end user's torso. In order to adapt to an end user's natural user interface paradigm, user interface engine 32 creates a non-linear user interface region 52 that reflects an arc centered around the end user. Non-linear user interface region 52 also serves to create a sense of immersion by wrapping visual content around an end user that adapts to an end user's reach and interactions. A depth camera 46 measures end user physical presence to define an arc radius adapt to the end user's arm-length, reach, posture and/or other factors. The presentation of visual information allows a fluid immersion that keeps content highlighted for viewing with adaptive window sizes based upon a view direction of an end user. For example, multiple icon states are presented to the end user based upon the end user's orientation and viewing angle. User interface windows digitally rotate and adjust to match an end user's viewing angle rather than forcing the end user to unnaturally orient his body and head to match a Cartesian display of information. In a multiple user paradigm, the immersed end user experience adapts to enhance collaboration. End user immersed environments may be saved to rapidly adapt to multiple saved workspace contexts based upon a position associated with an information handling system and other detected contextual values.

In the example embodiment depicted by FIG. 2, information handling system 10 supports end user interactions at a desktop 56 under management of a user interface engine 32. Although desktop 56 is depicted as a work environment centered at a desk surface, in alternative embodiments alternative work surfaces may be used with alternative arrangements of input and output devices. One or more detection devices, such as camera 46, detects positional information for a user relative to desktop 56 to define non-linear user interface region 54. One or more projectors 36 populate non-linear user interface region 54 with display arc icons 58 that each include one or more windows 60 having content associated with applications. Sets of one or more display arc icons 58 may be presented in projection display arcs 66 having a radius centered at an end user's point of shoulder rotation for the side of desktop 56 on which the projection display arc 66 is presented. In the example embodiment, first and second capacitive mat displays 38 rest on desktop 56 to present visual images with an integrated LCD and accept end user inputs with touches detected by integrated capacitive touch sensors. User interface engine 32 projects content with display 34, projector 36 and capacitive mat displays 38 in a coordinated manner adapted to an end user's preferences, such as by projecting around a position of capacitive mat display 38 detected by analysis of images captured by camera 46. For instance, end user touches or gestures are detected by camera 46 or capacitive mat display 38 and interpreted by user interface engine 32 to move content between presentation environments by having the graphics system define appropriate pixel information for display 34, projector 36 and capacitive mat display 38.

In addition to detecting end user touches and gestures, user interface engine 32 analyzes images captured by camera 46 to determine inputs made through totems 62. For example, totems 62 are "dumb" devices that indicate inputs based upon orientation or end user hand motions in their proximity. Alternatively, totems 62 may include limited intelligence and wireless communications capability that sends input data to information handling system 10. In some embodiments, totems 62 interact with capacitive touch sensors of capacitive mat display 38 to provide inputs from an end user to information handling system 10. For example, a keyboard totem 64 rests on a capacitive mat display 38 and accepts end user inputs to a mechanical key that presses downward on touch sensors with each key uniquely identified by relative position or the type of detected touch. In some embodiments, a capacitive mat 38 is provided without an integrated display to accept such touch inputs without the added expense of the LCD portion.

Figure 3:
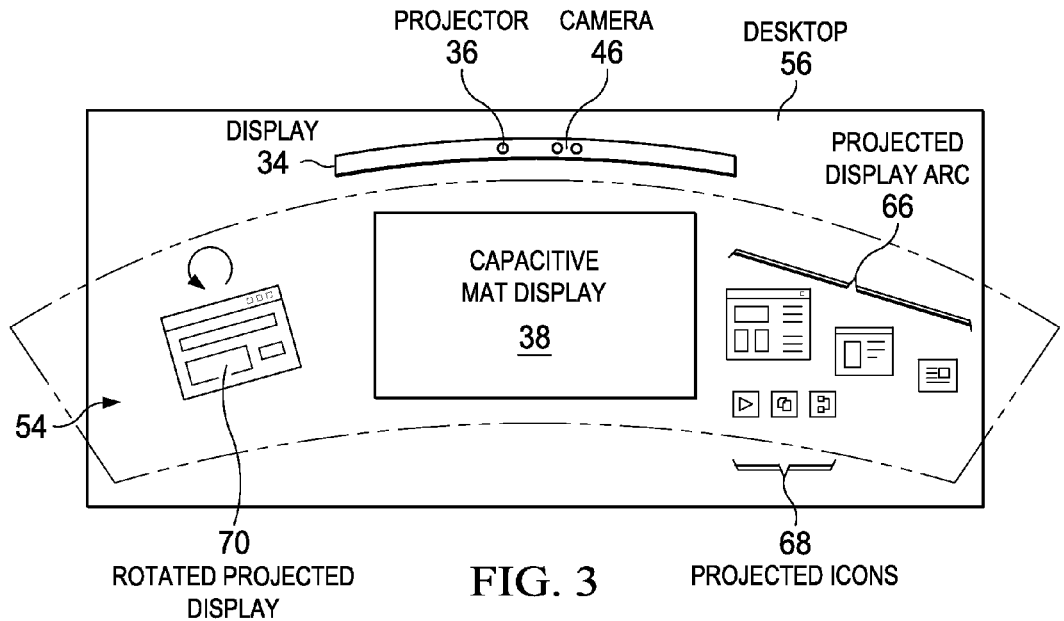
FIG. 3 depicts an upper perspective view of a desktop having information presented with non-linear orientations based upon end user position.

Referring now to FIG. 3, an upper perspective view depicts a desktop 56 having information presented with non-linear orientations based upon end user position. In the example embodiment, a rotated projected display 70 presents information in a window having an orientation aligned with the non-linear user interface region 54 so that an end user having a viewing positon at a central location of the arc views rotated projected display 70 in a natural orientation. Other projected content presented on desktop 56 may orient along Cartesian based reference points or with a polar reference system that aligns viewing positions relative to the end user. For example, projected icons 68 and projected display arc 66 align relative to the Cartesian coordinates extending from a detected position of capacitive mat display 38. As an end user changes orientation of viewing position, the size and orientation of windows in projected display arc 66 and of projected icons 68 may automatically adjust. If, for example, an end user shifts her view from rotated projected display 70 towards projected icons 68, the size of content within projected icons 68 increases for improved viewing by an end user. Upon selection with a finger touch detected by camera 46, the projected icon may further enlarge for presentation in projected display arc 66, on capacitive mat display 38 or as a rotated projected display presented in another area of projection display arc 66. The orientation of windows, whether in an active or icon state may be configured to default settings by an end user or adapted on the fly by gestures, such as indicating a rotation motion captured by camera 46 proximate to presented information.

Figure 4:
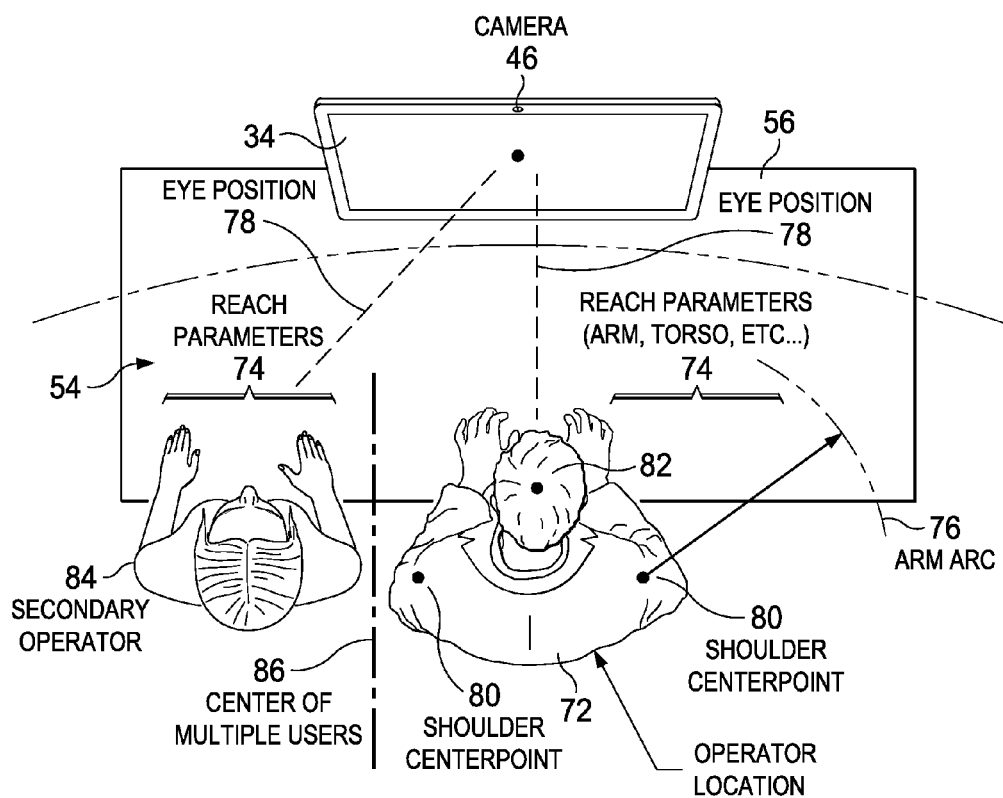
FIG. 4 depicts an upper perspective view of an example embodiment of end user parameters captured by user interface engine to present information in a non-linear user interface region.

Referring now to FIG. 4, an upper perspective view depicts an example embodiment of end user parameters captured by user interface engine 32 to present information in a non-linear user interface region 54. An end user operator 72 is depicted in a central location relative to display 34 and has an image captured by camera 46, such as with infrared structured light that aids depth measurements. End user interface engine 32 analyzes images captured by camera 46 to determine reach parameters 74 associated with end user 72, such as the arm length, posture, torso height, etc. . . . . Reach parameters 74 are applied to define an arm arc 76 between end user 72's shoulder position as centerpoint and a reach of end user 72 based on arm length that allows end user 72 to touch projected images. Images captured by camera 46 are also analyzed by end user interface engine 32 to determine an eye position 78 that indicates a viewing direction of end user 72. During operations, information may be presented at desktop 56 based upon Cartesian coordinates, such as anchored in position relative to display 34 or a capacitive mat display, or based upon polar coordinates that center in an arc relative to one or more centerpoints. For example, an arm arc 76 may define presentation of visual information for right and left sides of desktop 56 with a centerpoint 80 at the right and left shoulders of end user 72 so that non-linear user interface region 56 forms from two connected arcs. Alternatively, a single arm arc 76 may be defined from a centerpoint 82 of end user 72. In order to aid in collaboration during a multi-user interaction, camera 46 captures reach parameters 74 of additional users and creates a presentation centered at a location 86 between the multiple users. The multi-user presentation may adapt to reach of each end user based upon windows active to each end user, such as having a first arm arc 76 for user 72 and a second arm arc for user 84 with each arm arc having collaborative visual information presented in a region accessible by both users.

Figure 5:
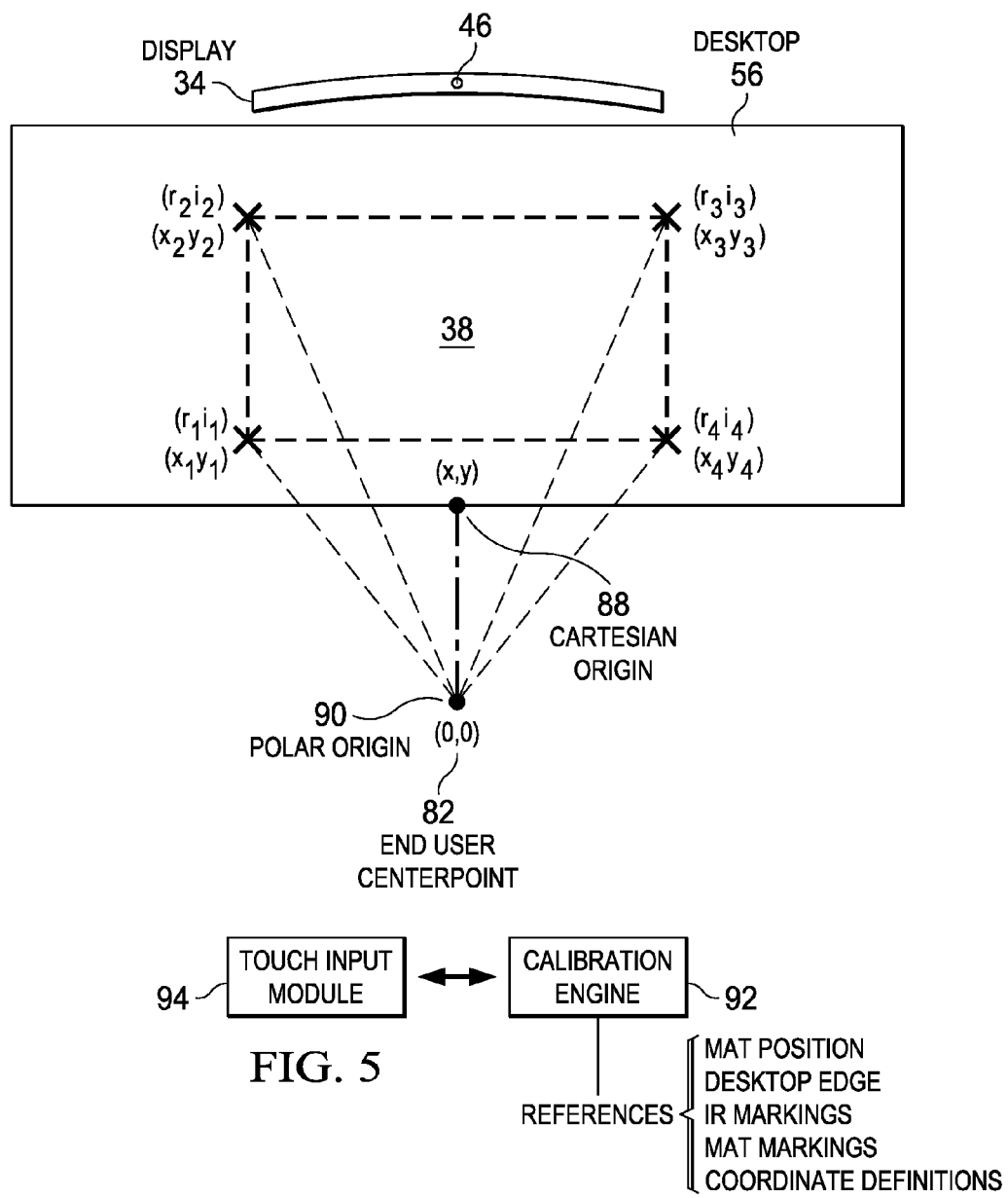
FIG. 5 depicts an upper perspective view of a relationship established between Cartesian and polar coordinates for presenting visual information at desktop.

Referring now to FIG. 5, an upper perspective view depicts a relationship established between Cartesian and polar coordinates for presenting visual information at desktop 56. In the example embodiment, Cartesian coordinates (represented by x and y) have an origin 88 located at a physical reference point identifiable by camera 46, such as an edge of desktop 56 or an edge of capacitive mat display 38. The anchor location for the Cartesian coordinates may be selected automatically based upon discernible physical reference objects, automatically based upon a projected or displayed reference, or manually based upon a user preference. Polar coordinates (represented by r and i) have an origin 90 located at a physical reference point associated with an end user reach or other interaction with presented information. In the example embodiment, Cartesian and polar coordinates are depicted for the four corners of capacitive mat display 38 with a translation performed by a calibration engine 92 between the coordinate systems. A touch input module 94 interfaced with calibration engine 92 tracks touch inputs by an end user to determines input locations of touches detected by camera 46 or capacitive sensors in display 38 to determine input values based on whether inputs are made to a device having a visual presentation oriented to Cartesian or polar coordinates. For instance, coordinates may be referenced by a capacitive mat display position, desktop edge, infrared markings placed by an infrared emitter or infrared display portion in capacitive mat display 38, by permanent calibration markings on capacitive mat display 38 or by other coordinate definitions.

As inputs are made and physical items detected on desktop 56, calibration engine 92 compares presented information positions relative to expected positions to continuously update coordinates at desktop 56.

Figure 6:
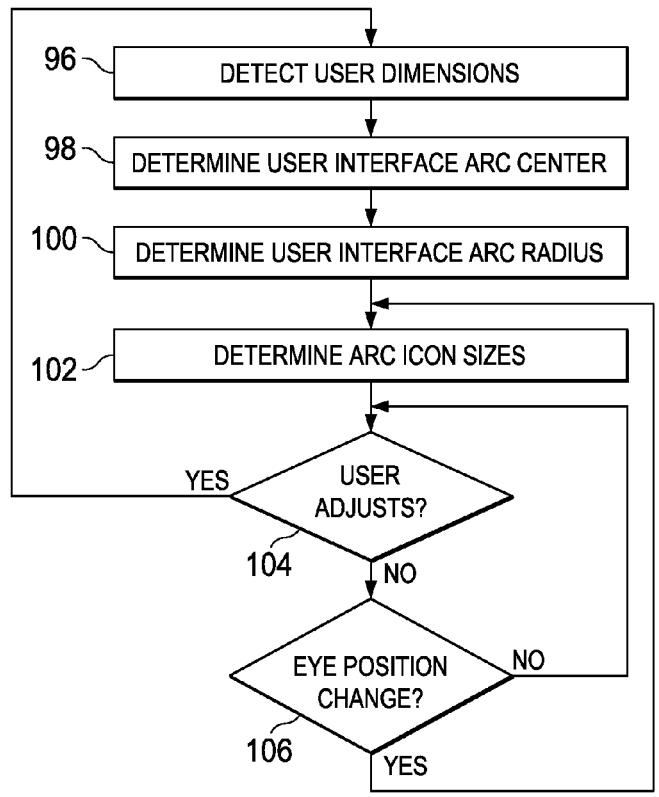
FIG. 6 depicts a flow diagram of a process for defining a non-linear user interface region at a desktop.

Referring now to FIG. 6, a flow diagram depicts a process for defining a non-linear user interface region at a desktop. The process begins at step 96 by detecting user dimensions, such as height, distance, reach parameters and other dimensions analyzed from an image of the use captured with a depth camera enhanced with structured infrared light. At step 98, the user dimensions are applied to determine a user interface arc center or centers based on the end user position. For example, a single centerpoint may be used the center of a user or set of users, or a set of centerpoints may be determined at different detected locations, such as shoulders, elbows, or at each of plural end users captured by the camera image. Alternatively or in addition to a center based upon end user location, other reference points may be determined based upon physical objects captured in a camera view, such a display or capacitive mat display on the desktop. At step 100, a user interface arc radius is determined based upon the detected user dimensions and centerpoint. For example, an arc radius is determined from a detected arm reach of an end user to present visual images in an arc area of the desktop within reach of the end user. In one embodiment, the arc area is defined to exclude certain portions of the desktop, such as portions covered by another display device, such as a capacitive mat display. At step 102, arc icon sizes are determined for presenting content in each of plural icon windows. As an example, icon size decreases for icons that are presented further from the center of an end user desktop, with active windows that present applications in use by an end user presented in larger windows. Icon size may also vary based upon an end user's body orientation relative to a desktop and an end user's eye gaze so that content of greater interest to the end user has a more prominent appearance. At step 104, a determination is made of whether an end user adjusts his position and, if so, the process returns to step 96 to determine new user dimensions. As long as an end user maintains a position within a threshold, the process continues to step 106 to determine if the end user has changed eye positions. If eye position change is detected, the process returns to step 102 to determine icon sizes, such as increasing the size of icons in the direction of the user gaze and decreasing icon sizes outside of the user's gaze. As long as the user gaze remains in a certain direction within a threshold, steps 104 and 106 repeat to adapt the presentation of information as changes are detected. For example, a user defined "focus" size is applied to windows projected on a desktop based upon a detected focus point of the user's gaze, with other windows presented at smaller sizes in proportion to the distance of each of the other windows from the focus point. As an end user elects to actively interact with content of a particular window, the selected window may be centered on the desktop or moved by a gesture to a primary display device, such as a capacitive mat display, or an input at a totem device, such as a rotation of a totem detected by capacitive sensors that adjusts the window in focus to a selected window indicated by the totem direction relative to the arc.

Figure 7:
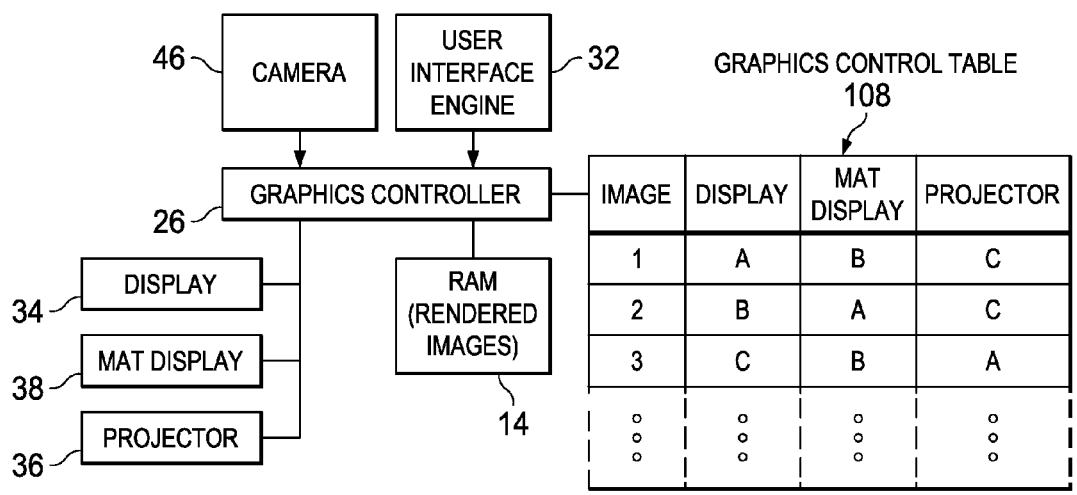
FIG. 7 depicts a block diagram of one example of a user interface engine implementation that presents images in display devices based upon priorities set in a graphics control table 108.

Referring now to FIG. 7, a block diagram depicts one example of a user interface engine implementation that presents images in display devices based upon priorities set in a graphics control table 108. Applications executing on an information handling system 10 generate visual information for presentation to an end user and provide the visual information to a graphics controller 26, such as with a shared memory location in RAM 14. Graphics controller 26 generates pixel information that defines visual images for presentation by display devices, such as display 34, projector 36 and mat display 38. In order to provide a rapid response in an immersed environment, graphics control table 108 associates images, such as windows that include image content, with display devices by order of priority. As user interface engine 32 detects changes in the immersed environment that alters presentation of visual information, graphics controller 26 directs rendered images from RAM 14 to an appropriate display device based upon the priorities in graphics control table 108. For example, if an end user drags image 1 from an icon state presented by projector 36 to an active state presented by mat display 38, user interface engine 32 moves image 2 from mat display 38 to display 34 if space is available or at projector 36 if space is not available. User interface engine 32 updates graphics control table 108 based upon end user interactions with applications associated with the images. In the immersed environment, as an end user alters posture, gaze or other factors, user interface engine 32 alters the presentation by the display devices by pointing rendered images from RAM 14 to desired display devices as defined by the priorities in graphics control table 108.

Figure 8A:
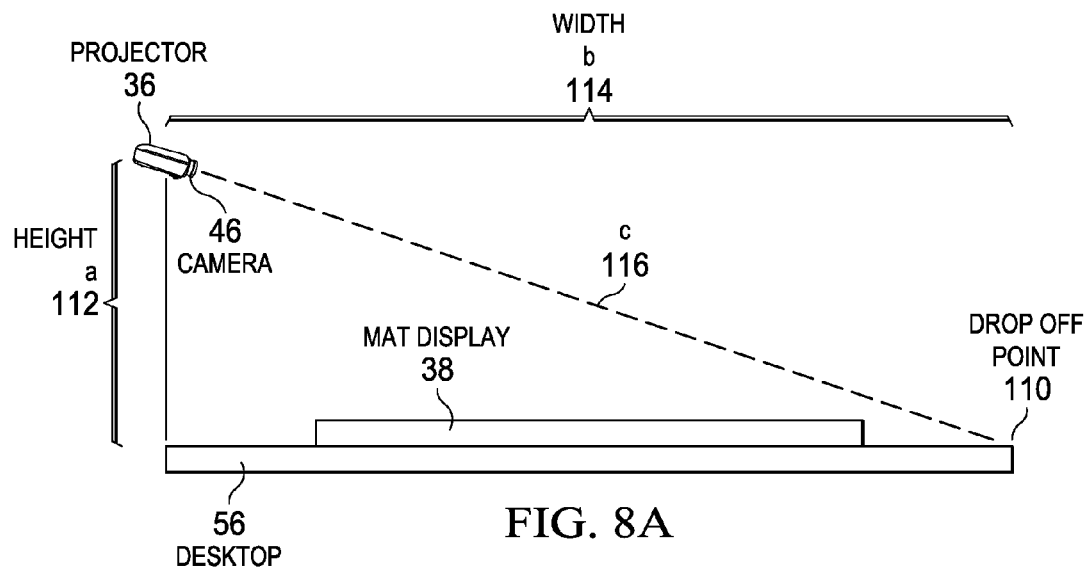
FIG. 8A depicts a side view of a system for adjusting and calibrating an immersed end user environment by detecting and referencing physical objects to calibrate input and output devices.

Referring now to FIG. 8A, a side view depicts a system for adjusting and calibrating an immersed end user environment by detecting and referencing physical objects to calibrate input and output devices. In the example embodiment, a depth camera 46 measures a distance 116 from a location proximate a projector 36 to a drop off point 110 at the end of the width 114 of desktop 56. For example, drop off point 110 is determined at a vector where camera 46 detects a jump in distance due to structured light proceeding past the end of end of desktop 56. The height 112 of camera 46 is known or estimated with the height of the display or stand on which it and projector 36 rests so that user interface engine 32 is able to calculate the width 114 of desktop 56. Once the width distance 114 is calculated, user interface engine 32 applies the width to adjust presentation of projected visual images and measurement of touch inputs for providing desired image size, aspect ratio, focus and keystone, as well as to obtain a desired precision for determining touch inputs. For example, coordinates defined on desktop 56 provide a reference relative to a physically-detected device, such as drop off point 110 so that inputs and projected outputs relative to non-fixed devices may be calibrated to obtain a desired accuracy, such as to provide a frame of reference to project outputs generated from a pen writing on desktop 56 in the location of the writing.

Figure 8B:
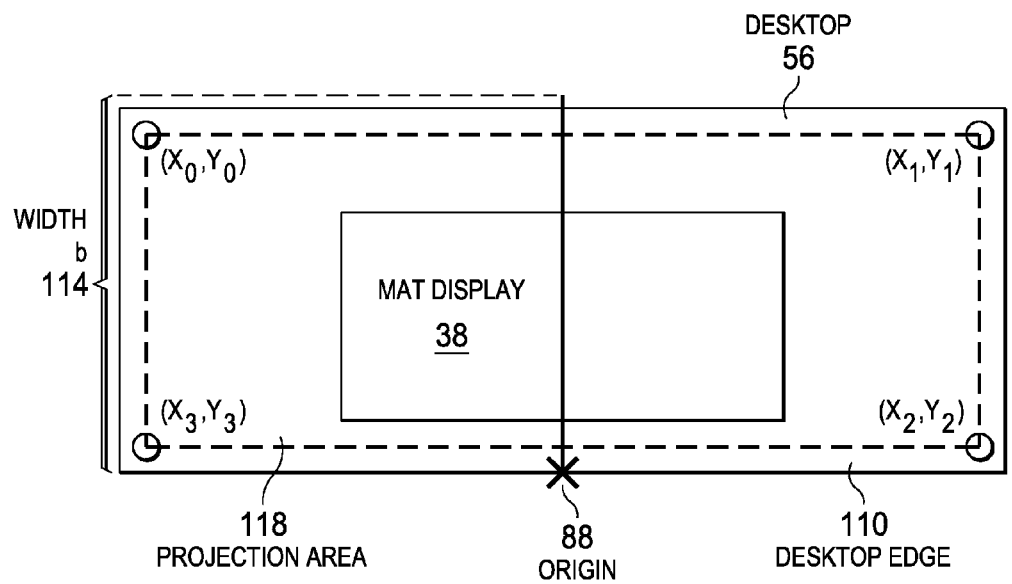
FIG. 8B depicts an upper view of a system for adjusting and calibrating an immersed end user environment by detecting and referencing physical objects to calibrate input and output devices.

Referring now to FIG. 8B, an upper view depicts a system for adjusting and calibrating an immersed end user environment by detecting and referencing physical objects to calibrate input and output devices. A projection area 118 is defined on desktop surface 56 with Cartesian coordinates (x,y) relative to origin 88, defined by the measured desktop edge 110. Alternatively, coordinates may be defined relative to edges detected for mat display 38, such as by the difference in height of mat display 38 relative to desktop 56, permanent markings or coloration at mat display 38, or calibration markings presented as visual images at mat display 38. User interface engine 32 applies the coordinates and projection area to present visual images with projector 36 and mat display 38 in a coordinated fashion, including with a translation to polar coordinates for a non-linear user interface as set forth above. For example, in one embodiment visual information presented at mat display 38 and by projector 36 are both coordinated according to the Cartesian coordinates defined from origin 88 so that images fit and even overlap in a desired manner.

Figure 9:
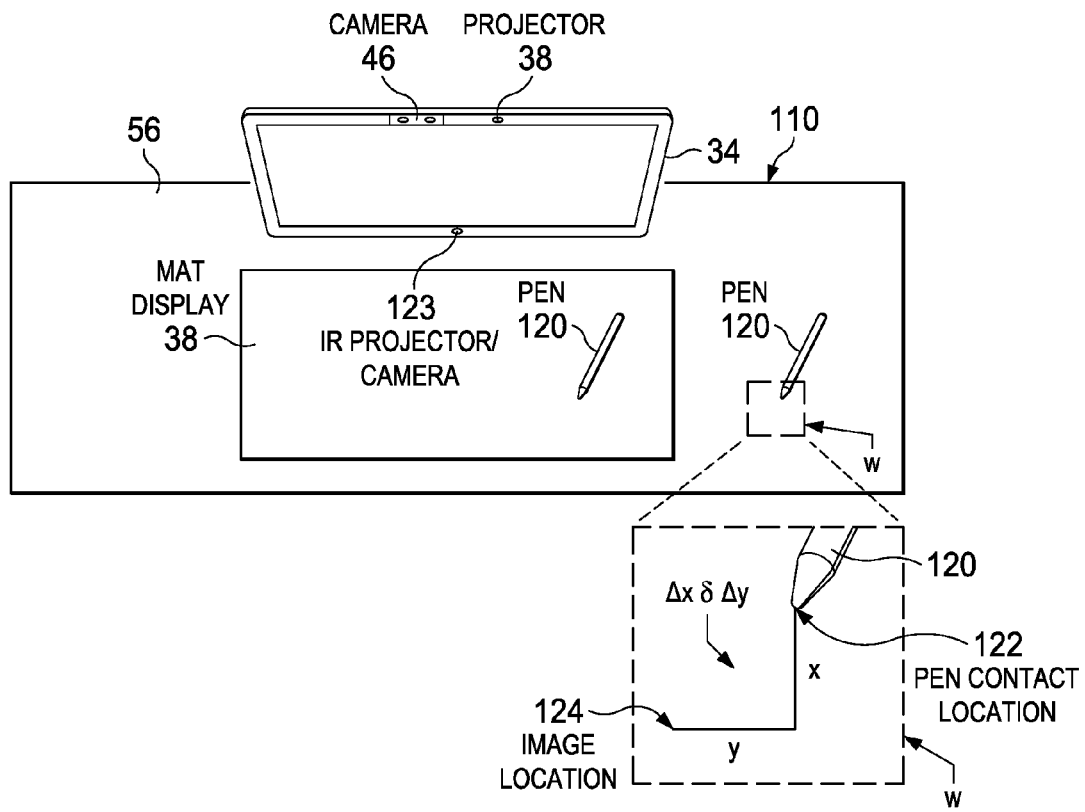
FIG. 9 depicts an upper view of an exemplary system for adjusting and calibrating an immersed end user environment by detecting and referencing physical objects to calibrate input and output devices.
Figure 10:
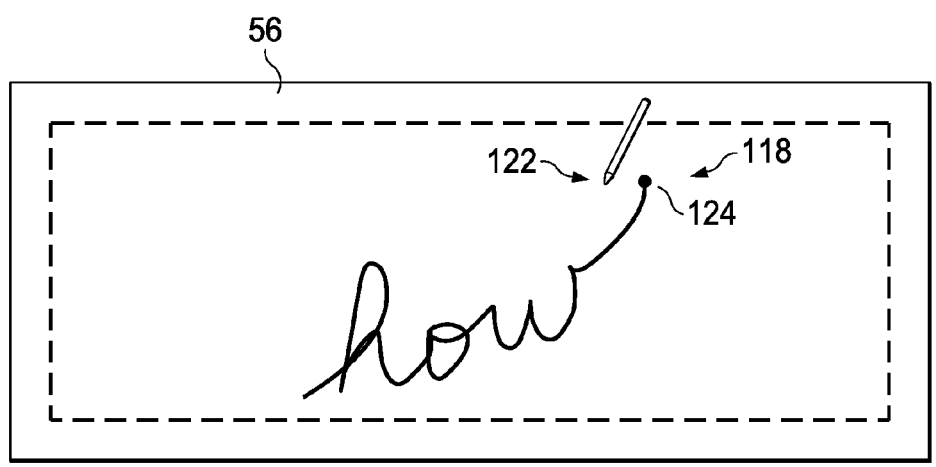
FIG. 10 depicts an example of an end user writing the word "how" on a desktop and disorientation that may happen when projected written visual images vary from pen locations determined by a three dimensional camera.

Referring now to FIG. 9, an upper view depicts an exemplary system for adjusting and calibrating an immersed end user environment by detecting and referencing physical objects to calibrate input and output devices. The calibration engine 92 and touch input module 94 depicted by FIG. 5 coordinate input and output devices to synchronize presentation of visual information by multiple display devices according to a common coordinate system. In particular, projection touch systems are usually calibrated with a fixed position between a camera and projector once before use, however, over time calibration shifts and in some instances physical binding is not available. Calibration engine 92 uses sensed touches from multiple available detection devices and physical objects to provide a continuous calibration for an immersed end user environment even with plural physically disconnected projectors and cameras presenting plural visual images and detecting plural inputs. As is illustrated by FIG. 10, an end user writing the word "how" on a desktop will experience disorientation when projected written visual images 124 vary from pen locations 122 determined by a three dimensional camera. To maintain detected and projected input locations within a desired deviation, a camera detects the tip of a pen (or finger or other writing/input utensil) where an annotation is made and the projected annotation to determine a deviation. A calibration engine converts the deviation linear distance into a number of pixels using DPI values obtained from the projectors EDID/DID and corrects deviations that exceed a threshold by changing the projected position. Calibration by camera detection of visual images may be performed based upon an actual output for presentation to a user with infrared output not visible to a user, such as output from an infrared projector/camera 123 used for an IR curtain to detect touch inputs but captured by camera 46. Synchronization of display and input coordinates may be based on Cartesian and/or polar coordinates as described above.

In the example embodiment depicted by FIG. 9, a touch input module 94 determines a location of touches detected by images captured with camera 46 with reference to Cartesian coordinates established relative to the desktop drop off 110. Calibration engine 92 compares locations of detected inputs and the location of projection of outputs made in response to the detected inputs to correct projection area 118 for errors introduced by movements at desktop 56. One example of such corrections is depicted with respect to inputs made by a pen 120 at touch sensors of mat display 38 and projection area 118 disposed on desktop 56. As illustrated in the exploded view, a pen contact location 122 is the intended location for presentation of end user inputs while an image location 124 is the actual location of presented visual information in response to pen contact. A delta in the x and y coordinates is determined for the difference between the intended and actual output position and applied by calibration engine 92 to shift the coordinates applied to projector 36 and camera 46 for obtaining more precise alignment. For example, an image captured by camera 46 detects both pen contact location 122 and image location 124 so that the calibration engine 92 calculates delta x and delta y and corrects the projection image location 124 presented by projector 36. As another example, an image of mat display 38 captures pen contact location 122 on mat display 38 and compares the coordinates of pen contact location 122 detected from the camera and capacitive sensors of mat display 38 to determine delta x and delta y. In one embodiment, calibration is performed periodically based upon items resting on display mat 38, such as coffee cups or other items not in use for making inputs. In various embodiments, corrections are applied to coordinates used by one or more of each of projector 36, camera 46 and even mat display 38 so that a coordinated immersed presentation of inputs and outputs is managed with a common coordinate system. In order to prevent jitter from corrections that are applied too often, corrections are applied when the delta between projected and detected positions exceeds a threshold, such as 2 mm. The threshold may vary based upon detection accuracy, projection distance, and whether the camera and projector are co-located or separately located.

Figure 11:
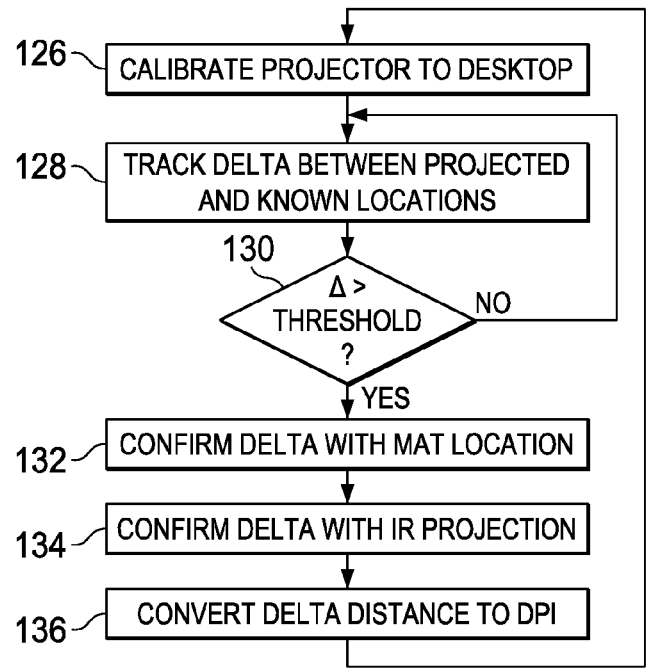
FIG. 11 depicts a flow diagram of a process for correcting presentation of visual information relative to an input location.

Referring now to FIG. 11, a flow diagram depicts a process for correcting presentation of visual information relative to an input location. The process starts at step 126 by calibrating a projector image to a desktop surface, such as a defining a projection area with reference to a fixed position like the desktop edge as described above. At step 128, the delta between projected and known locations is tracked, such as by comparing positions of visual images presented on a desktop and captured with a camera to intended positions for the visual images, such as relative to a coordinate system. For example, images presented on a mat display may be used to determine deviation of a camera from a coordinate system defined in part relative to the mat display position. As another example, images projected on a desktop surface may be used to determine deviation of a projector from a coordinate system defined in part relative to the camera alignment. At step 130, a determination is made of whether a detected deviation exceeds a threshold. If not, the process continues to step 128 to continue tracking of deviations. If a threshold is exceeded, the process continues to step 132 to confirm the delta with a capacitive mat display position if one is available. For example, touching by any object at a capacitive mat provides a position through the capacitive sensors for comparison with a position detected by a depth camera. At step 134, the delta in position is confirmed with a position detected by infrared projection and detection with a camera. For example, an infrared projection at a known position, such as a corner of a capacitive mat display is compared with a position detected by a camera that takes an image of the infrared light. Infrared projection may be initiated in response to detection of the threshold as a way to enhance calibration. At step 136, the detected delta is converted into DPI so that visual images are presented at a corrected location adjusted to reduce the delta by changing the pixel values to match the corrected projection position.

Figure 12:
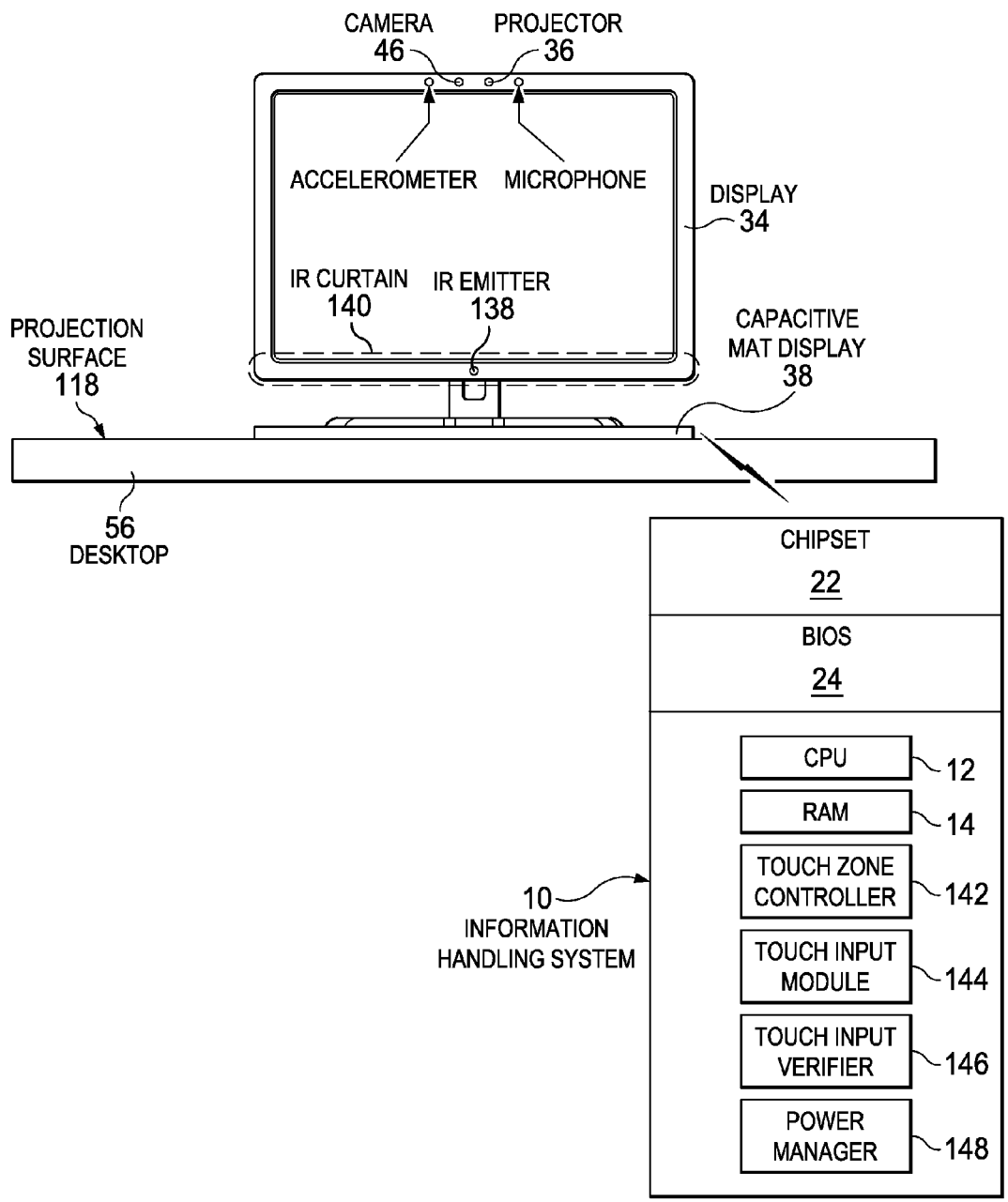
FIG. 12 depicts a side view and block diagram of an information handling system adapted to disambiguate false touch inputs on a projection surface.

Referring now to FIG. 12, a side view and block diagram depict an information handling system 10 adapted to disambiguate false touch inputs on a projection surface 118. An infrared emitter 138 generates an infrared curtain 140 over a projection surface 118 to detect touches by detecting a break of the curtain by an end user finger, such as when typing at a projected keyboard. Projected keyboards are sometimes difficult for end users to adapt to since incidental movements through the curtain sometimes result in unintentional key inputs. For example, a typical IR curtain 140 is projected 2 to 3 mm above an actual projection area 118 so that resting fingers, such as at a home row, break IR curtain 140 even though an input is not intended. In order to verify that touches are intended as inputs, a touch input verifier 146 analyzes other indications of an input to validate inputs detected by breach of IR curtain 140. For example, touches detected by capacitive sensors in capacitive mat display 38, accelerations detected by an accelerometer 158, taps heard by a microphone 160 and motions or home key resting noted by a camera 46 are combined with IR curtain 140 detection to disambiguate intended from false touch detections. Selective engagement of different verification devices based upon context and desired accuracy helps to manage power conservation related to disambiguation logic, such as during battery operation of information handling system 10 and the various detection devices used to disambiguate touches.

Figure 13:
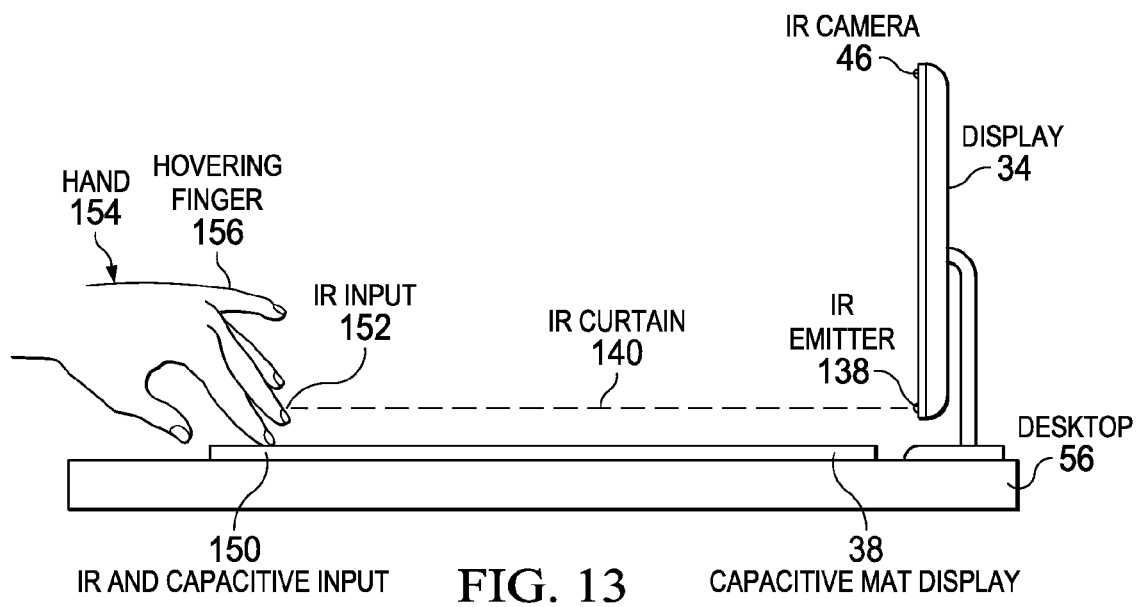
FIG. 13 depicts a side view of interaction by a human hand and fingers with an IR curtain having touches validated by touch input verifier.

Referring now to both FIGS. 12 and 13, FIG. 13 depicts a side view of interaction by a human hand 154 and fingers 156 with an IR curtain 140 having touches validated by touch input verifier 146. A touch zone controller 142 manages the immersed end user environment by selectively allocating detection device resources to distinguish end user inputs with a desired accuracy. A touch input module 144 interfaces with chipset 22 for access to graphics and detection device information to determine end user inputs at a desktop 56, such as inputs made to projected visual images in a projection surface 118. In the example embodiment, touch inputs are to a keyboard presented by a projector 36, however, in alternative embodiments, touches to other visual images are detected and verified as set forth herein. Touch input module 144, for example, analyzes images captured by camera 46 to detect touch inputs at a projected keyboard by reference to breaches of IR curtain 140. Touch input verifier 146 verifies inputs detected by touch input module 144 by reference to other sensed conditions. The availability of sensed conditions is managed in part by a power manager 148, which selectively powers detection devices for use by touch input verifier based upon available power and desired accuracy. For example, power manager 148 selectively powers up detection devices and processing resources for use by touch input verifier based in part on availability of external power versus battery and indications of inaccurate touch detections by touch input module 144, such as indicated by end user corrections to typed input or automated corrections. If, for instance, an end user begins typing on battery power, power manager 148 may restrict verification to sensed conditions detected by accelerometer 158 or microphone 160, such as by detecting taps; if the user then plugs in external power, power manager 148 allocates processing resources to analyze three dimensional images captured by camera 46.

Capacitive mat display 38 provides a powerful tool for use by touch input verifier 146, whether a keyboard is projected over a capacitive mat that lacks a display or is presented by a display integrated in the capacitive mat display 38. For example, when a finger 150 on hand 154 contacts capacitive mat display 38, a sensed input is detected by both infrared detection of a breach of IR curtain 140 and a sensed touch by capacitive sensors. When a finger 152 breaches IR curtain 140 but does not touch capacitive mat display 38, an ambiguity exists regarding whether a touch was intended. Touch input verifier 146 uses available sensed conditions and historical input information to disambiguate the end user's intention. One way to disambiguate end user intentions is to compare distance a velocity information associated with end user fingers at relative positions of capacitive mat display 38 and a projected or displayed keyboard. For instance, a hovering finger 156 has little if any sensed proximity to capacitive mat display 38 but is distinguishable by camera 46 relative to a presented or projected keyboard so that touch input verifier implies an input is not intended should hovering finger 156 breach IR curtain 140. Finger 152 indicates an input by breaching IR curtain 140, however, touch input verifier 146 disambiguates a false input by analyzing sensed proximity with capacitive mat display 38 for finger 152 based upon a position provided from an image captured by camera 46. For instance, if capacitive sensors in mat display 38 detect finger 152 in a constant distance, a touch is determined as not intended; if, however, capacitive sensors in mat display 38 sense motion of finger 152 by detecting changes in sensed position, then an intended input may be determined. In various embodiments, motion is detected and/or confirmed by other detection devices, such as sounds or vibrations induced by physical contacts and detected by microphone 160 and accelerometer 158, or finger motion detected by camera 46, such as a three dimensional depth camera operating with structured IR light.

Figure 14:
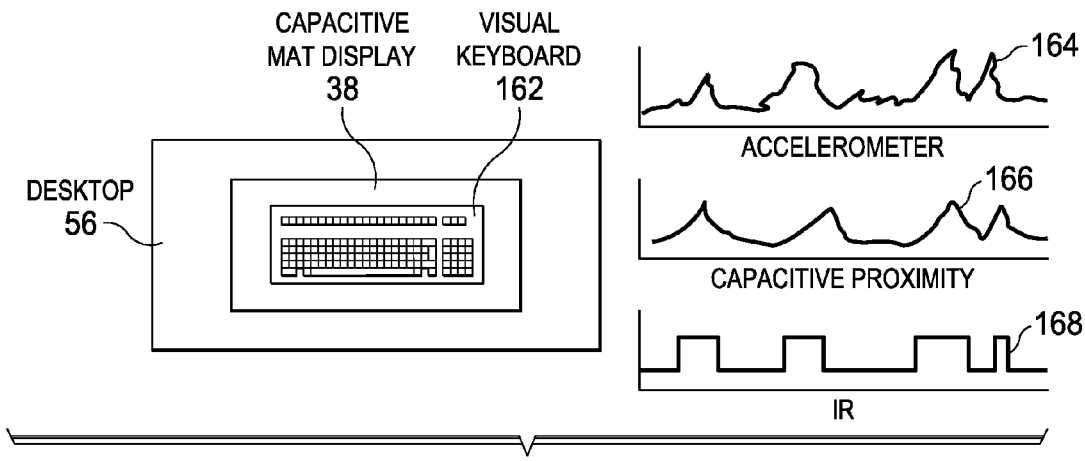
FIG. 14 depicts an overhead view of a desktop having a visual keyboard depicted to illustrate various embodiments of touch input verification.

Referring now to FIG. 14, an overhead view of a desktop 56 having a visual keyboard 162 is depicted to illustrate various embodiments of touch input verification. Visual keyboard 162 may be presented by capacitive mat display 38 or by a projector 36 with touches detected by either capacitive sensing or IR curtain breaches based upon power conditions or other context at the immersed end user environment. For example, in one embodiment, inputs are detected by touches to capacitive mat display 38 and verified by breaches of IR curtain 140 when on battery power and vice versa when on external power. In some embodiments, a capacitive mat is placed on desktop 56 that does not include an integrated display, and thus used to detect touches and proximity without presently visual images. Touch zone controller selects projector 36 or mat display 38 for presenting visual keyboard 162 based on context and also assigns detection devices to detect inputs based upon context and the selected presentation device. Touch input verifier 146 uses available detection devices to verify inputs detected by the primary device selected by touch zone controller 142. In the example embodiment, accelerometer graph 164 depicts accelerations detected over time with peaks occurring at contact of an end user finger on desktop 56. A similar graph based upon microphone detection of audible noise may be used. Capacitive proximity graph 166 depicts capacitive sensed inputs at a location over time with the detected value increasing as a finger comes closer to a sensor and peaking at contact with the sensor. Changes in capacitive sensed values over time indicate motion relative to a sensor position. Infrared graph 168 indicates spikes in value as an end user finger breaches an IR curtain in a position.

As an example of disambiguation, an end user initiates typing on visual keyboard 162 by placing all fingers on mat display 38. Touch input module receives inputs of touching through IR curtain 140 and mat display 38 but disambiguates inputs by depth camera detection of home row touching with analysis of camera 46 images showing fingers on presented home rows as well as by lack of accelerations and lack of sound. As an end user initiates typing, analysis of IR curtain detection, capacitive proximity and touches, accelerations, sounds and visual image motion results in a comparison between fingers to verify inputs as intended versus unintentional touches. For instance, all fingers may rest on mat display 38 with one finger lifted and tapped to make repeated inputs at a visual keyboard 162 key. By comparing inputs of fingers as sensed by multiple detection devices, touch input verifier 146 disambiguates the tapping finger as the intended input. During rapid typing, continuous analysis of all detection devices with comparison between fingers and hands provides improved accuracy of detection of intended inputs in a manner that adapts to an end user's usage pattern rather than requiring the end user to adapt to sensor rules.

Figure 15:
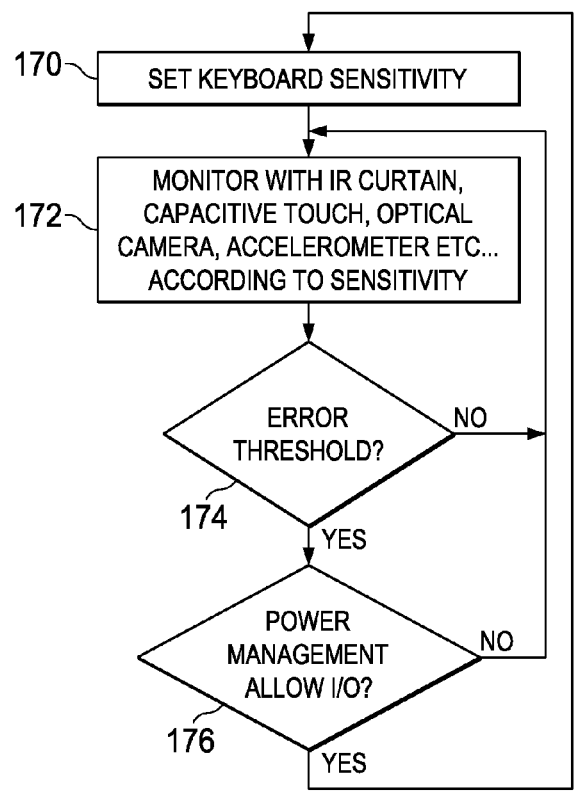
FIG. 15 depicts a flow diagram of a process for disambiguating intended from unintended inputs at a presented keyboard.

Referring now to FIG. 15, a flow diagram depicts a process for disambiguating intended from unintended inputs at a presented keyboard. At step 170 keyboard sensitivity is set for a presented visual keyboard. Sensitivity may depend a detected user, that user's settings, context of the immersed environment, the primary touch input detector and the available detectors for providing touch verification. At step 172, available detection devices are monitored to sense inputs and verification according to the selected keyboard sensitivity. At step 174, a determination is made of whether an error threshold is exceeded. The error threshold may be based upon corrections made by an end user after inputs are made or automated corrections. The error threshold may also be based upon probabilities associated with disambiguation. For example, a higher error threshold may be determined even where inputs are accurately detected if a probability of an error increases due to a more narrow determination between intended versus unintended inputs. If the error threshold is not met, the process returns to step 172 to continue monitoring inputs. If the error threshold is met, the process continues to step 176 to determine whether power management will allow the use of additional detection devices to disambiguate inputs. If not, the process returns to step 172 to continue monitoring detection devices. If additional detection devices are available, the process returns to step 170 to set up keyboard sensitivity with the additional detection devices. In one embodiment, input disambiguation begins with the use of all available detection devices to have accurate detection and then selectively powers down detection devices to reduce power consumption until the probability of accurate input detection reaches a desired level.

Figure 16:
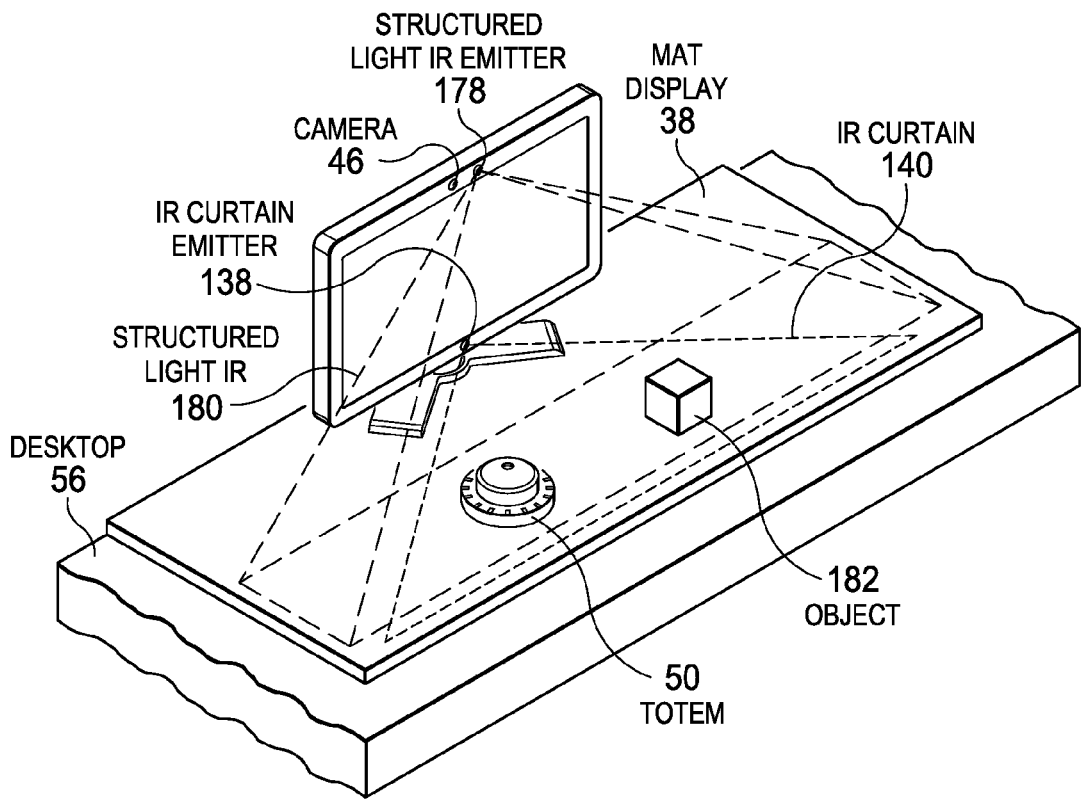
FIG. 16 depicts an upper perspective view of selective illumination from IR curtain and IR structured light emitters to interleave IR light sources for simultaneous object and touch recognition.
Figure 17:
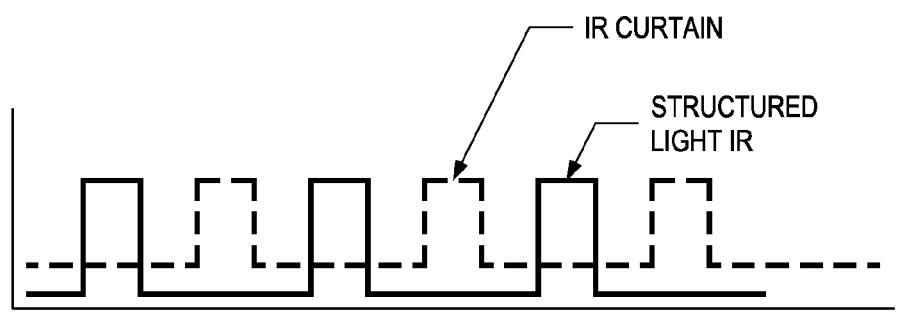
FIG. 17 depicts an example of evenly dispersed IR curtain and structured light interleaved emissions.

Referring now to FIG. 16, an upper perspective view depicts selective illumination from IR curtain and IR structured light emitters to interleave IR light sources for simultaneous object and touch recognition. By interleaving IR emissions from different emitters, the functions provided by the different emitters is supported by a common CMOS or other camera detection device. A common camera 46 captures images of desktop 56 for both a structured light infrared emitter 178 and infrared curtain emitter 138 and associates images with structured light and IR curtain functions based upon the source that emitted IR light when an image is captured. For example, touch input module 144 determines an interleave rate for structured light IR emitter 178 and IR curtain emitter 138 to alternate in emission of IR light based upon the types of inputs in progress by an end user. During depth map extraction, structured light emissions interleave at more frequent rates relative to IR curtain emissions. During typing end user inputs to a projected or displayed keyboard, IR curtain emissions interleave at a more frequent rate than when no typing is performed and structured light emissions are made less often since an end user is less likely to perform inputs in need of three dimensional object detection. FIG. 17 depicts an example of evenly dispersed IR curtain and structured light interleaved emissions. In one embodiment, during active depth mapping structured light is emitted at approximately 30 frames per second; and during active typing touch input detection, IR curtain emitter 138 emits at approximately 130 cycles per second.

In the example embodiment, with an end user absent from desktop 56, structured light 180 from structured light IR emitter 178 is presented at intervals that occur less often for the purpose of storing and maintaining a map of desktop 56, such as the position of totems 50 or other objects 182 disposed on desktop 56. Camera 46 captures images during the time periods at which structured light is emitted to detect the introduction of an end user or a change is the disposition of objects at desktop 56. During the absence of an end user, IR curtain emitter 138 remains idle since typing or other touch inputs are not imminent. Once an end user is detected near desktop 56 structured light IR emitter 178 emits light at a greater rate to detect end user positions and inputs. If an end user is detected in a position associated with a gesture input or manipulation of a totem 50, structured light rates may be set as needed to obtain desired depth mapping accuracy. If an end user is detected placing hands in a typing position, such as with analysis of depth camera images or touches detected at capacitive mat display 38, structured light IR emitter 178 and infrared curtain emitter 138 initiate interleaved IR light emissions at timed intervals so that images captured by camera 46 may be tied to an IR light source for analysis. If an end user initiates typing, structured light IR emitter 178 may stop illuminating or may illuminate a less frequent intervals to provide support for typing input validations as set forth above with three dimensional mapping performed with structured light between multiple emissions of IR curtain light. Although the example embodiment relates to touch inputs during typing, similar management of interleaved IR emissions of structured and IR curtain light may be applied when writing on a desktop with a pen or other implement detected by camera 46 or mat display 38. In one embodiment, power management is applied during touch typing to vary the structured and IR curtain light emission rates relative to each other in order to obtain accuracy probabilities of a desired amount.

Figure 18:
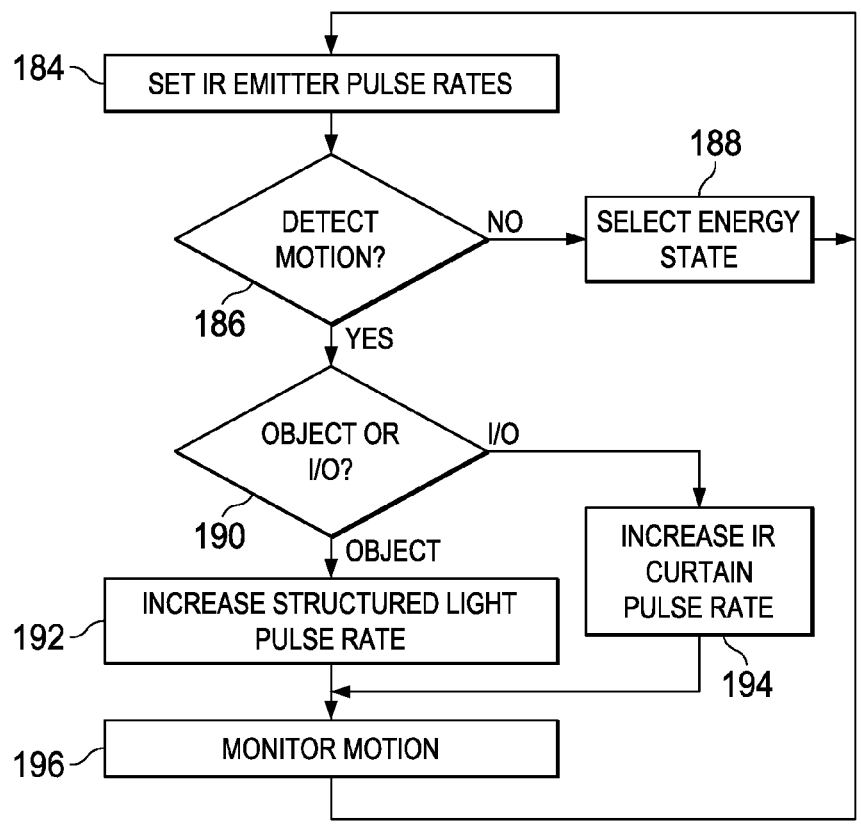
FIG. 18 depicts a flow diagram of a process for setting first and second infrared light emitter emission rates based upon a context at an immersed end user environment.

Referring now to FIG. 18, a flow diagram depicts a process for setting first and second infrared light emitter emission rates based upon a context at an immersed end user environment. The process starts at step 184 by setting infrared emitter pulse rates. For example, an initial setting might have structured IR light emitted at relatively infrequent intervals due to a lack of end user activity and IR curtain light in an idle state with no emissions due to a lack of end user body parts in the vicinity of a touch detection surface. At step 186, a determination is made of whether motion is detected proximate the end user input area, such as a desktop and/or projection surface. If motion is not detected at step 186, the process continues to step 188 to select an energy state and returns to step 184 to set IR emitter pulse rates according to the energy state. For example, an extended idle time may result in power down of the information handling system 10 and infrequent IR structured light emissions so that information handling system 10 returns to a powered state when an end user approaches. If motion is detected at step 186, the process continues to step 190 to determine if the motion relates to an end user touch input or an object in the desktop area, such as a totem or gesture input. If the detected motion relates to an input/output, the process continues to step 194 to increase IR curtain emissions for more accurate touch detections. If the motion relates to an object or other non-touch input, the process continues to step 192 to increase structured light pulse rates for improved object detection. The particular IR emission settings at step 192 and 194 may vary based upon the type of detected motion. For example, motion at a touch detection surface may result in only IR curtain emissions while motion away from a touch surface may result in no IR curtain emissions. The relative ratio and rate of interleaved IR emissions from the structured and IR curtain emitters may vary based on other factors, such as power management settings. At step 196, motion is monitored with the emitted infrared light and the process returns to step 184 to continue adapting structured and IR curtain light to the immersed end user context as necessary for determining end user inputs.

Figure 19:
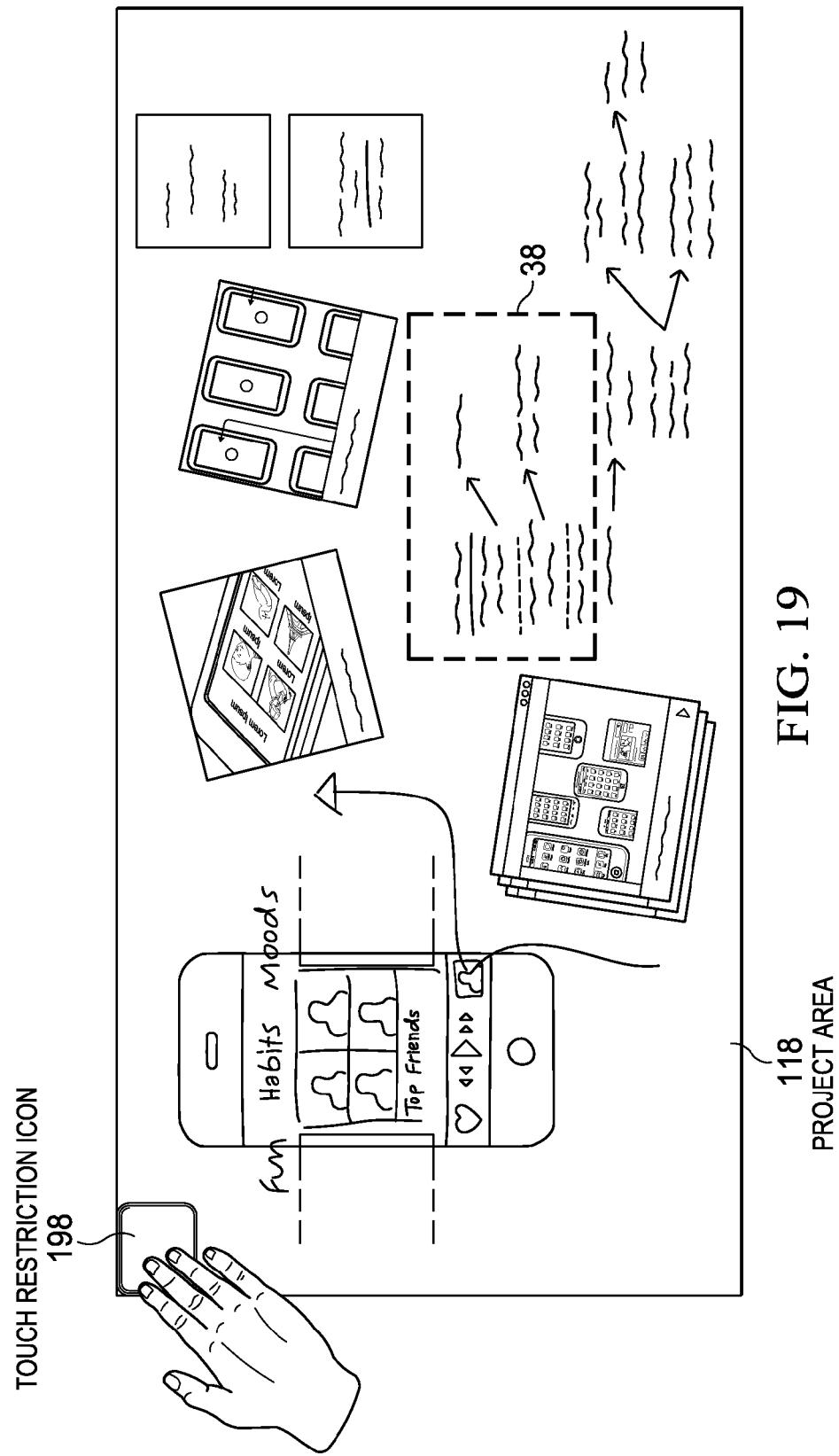
FIG. 19 depicts an example of a projection area with a touch restriction icon that is manipulated by an end user to identify regions of the projection area in which predetermined touches are disregarded.

Referring now to FIG. 19, an example of a projection area 118 is depicted with a touch restriction icon 198 that is manipulated by an end user to identify regions of projection area 118 in which predetermined touches are disregarded. Essentially, end user manipulation touch restriction icon 198 defines an adjustable digital screen locker with touch zone controller 142 that partially disables inputs detected by touch input module 144 at user defined zones while continuing to present visual information in the defined zones. For example, projection area 118 is rectangular and touch restriction icon 198 defines a perimeter within projection area 118 in which certain inputs are ignored. In alternative embodiments, an adjustable digital screen locker may be defined with other indications, such as gesture or voice commands. Within projection area 118 multiple adjustable digital screen lockers may be defined with each defined area having its own independently defined filter for touches to ignore. Touch zone controller 142 provides smart rejection of touch inputs from common objects so that the objects are ignored by automatically defining an adjustable digital screen locker around such objects as the objects are identified, such as pens, coffee cups, paper, etc. . . . identified by a depth camera. Further, the adjustable digital screen locker may selectively include capacitive mat display 38 or a portion of it if mat display 38 falls within a touch restricted area. In this way, a zone defined across multiple touch detection devices coordinates management of touch detection based upon a common filter.

Figure 20:
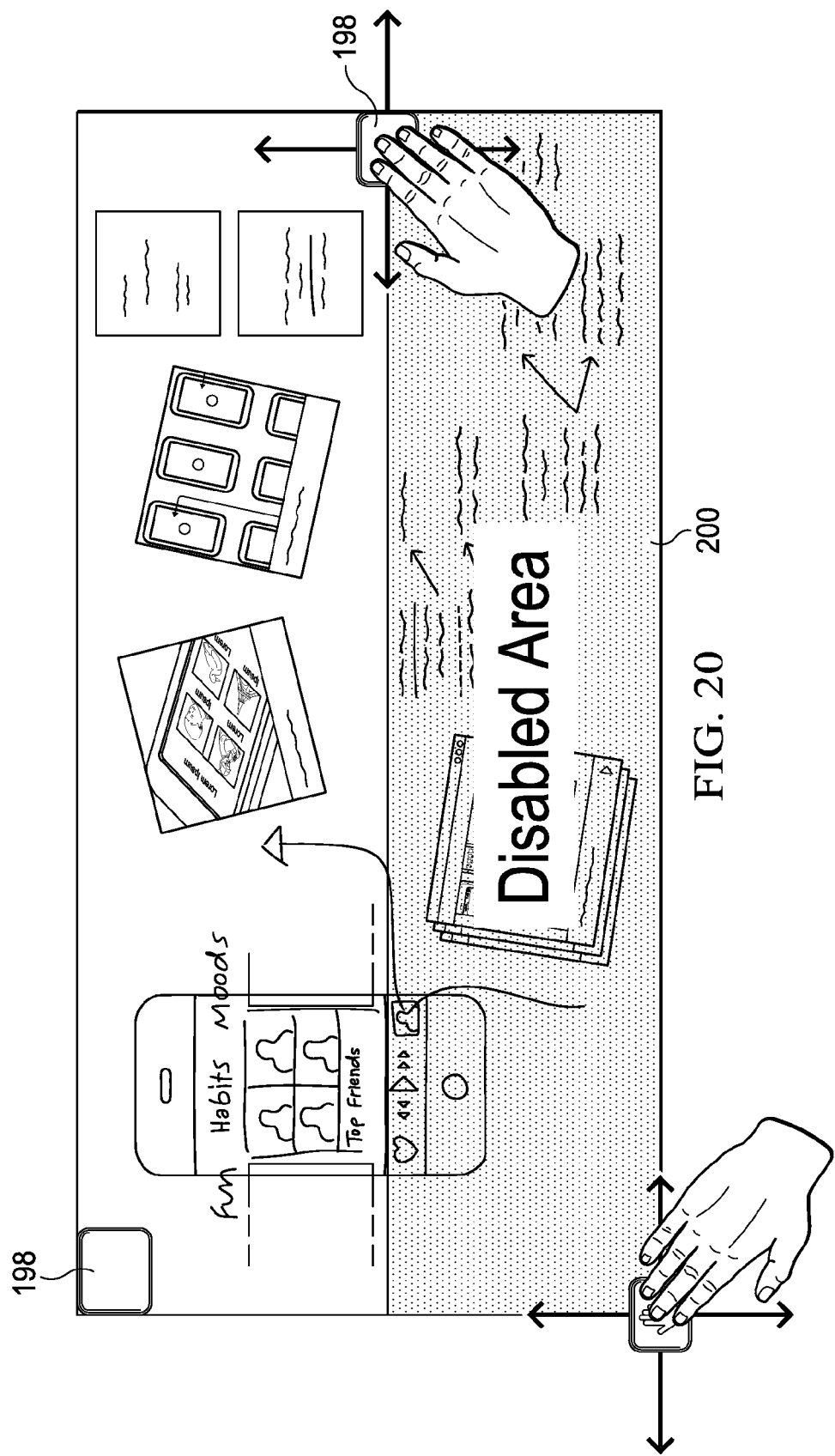
FIG. 20 depicts a projected user interface that includes an adjustable digital screen locker defined by opposing motion of touch restriction icons.

Referring now to FIG. 20, a projected user interface includes an adjustable digital screen locker 200 defined by opposing motion of touch restriction icons 198. In the example embodiment, touch restriction icons 198 define a single rectangular screen locker 200 that excludes all touches from detection as inputs by touch input module 144. The disabled area is temporarily labeled as such and then presented with highlighted visual images to remind the end user of the disabled status. For example, screen locker 200 may have a slight coloration difference, a dotted or solid perimeter line, or a slight brightness difference. In one embodiment, the varied visual presentation may indicate the type of touch filter applied to screen locker 200. For example, touch zone controller 142 defines filters that allow recognition of only finger touches, only pen device touches, only totem touches, only camera recognized touches, only capacitive mat display recognized touches, only motions of at least a predetermined size, only typing touches, or various user-defined combinations of such types of touches. For instance, an end user may define a projected keyboard portion as restricted to detect only finger touches with a user's hands deployed in a typing position and a mouse pad next to the projected keyboard and disposed on a capacitive mat that only detects a pointed finger input. Touch zone controller 142 monitors inputs detected by touch input module 144 and filters inputs detected within a screen locker 200 that meet filter settings. Although screen locker 200 is depicted in FIG. 20 as having a rectangular shape, it may have other shapes as defined by an end user, such as circle, triangle or object-sized shapes that match the size of an object placed in the projection area.

Figure 21:
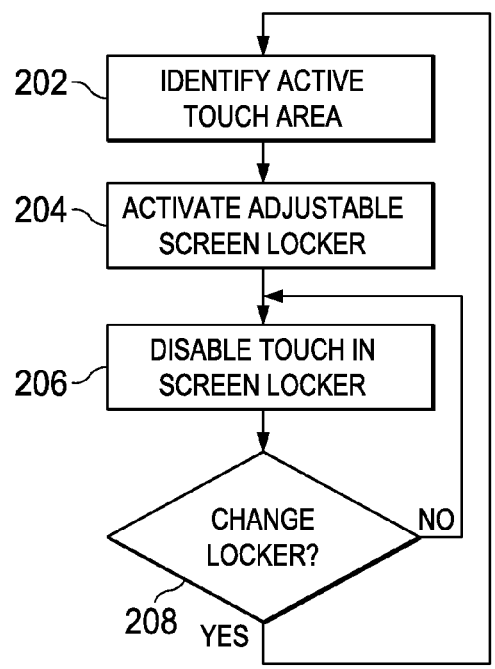
FIG. 21 depicts a flow diagram of a process for defining a restricted touch screen locker zone in a desktop immersed environment having touch detection sensing.

Referring now to FIG. 21, a flow diagram depicts a process for defining a restricted touch screen locker zone in a desktop immersed environment having touch detection sensing. At step 202 an active touch area is identified, such as a projection area presented on a desktop or other surface. The touch area is, for example, monitored by a depth camera to detect touches at projected images, and may include other touch devices, such as a capacitive mat display. At step 204, an adjustable screen locker is activated that defines a region of the touch area to have a filtered or otherwise modified touch input response. At step 206, touch detection for the filtered touch inputs is applied in the screen locker. For example, a writing pad defined on a projection surface as a screen locker accepts touch inputs from a pen utensil in the writing pad area but filters other touch inputs to the writing pad so that the inputs do not show up in the projection. As another example, the remainder of the projection surface outside of the writing pad is defined as a screen locker that accepts touch inputs except for pen utensil touch inputs so that pen utensil touches outside of the writing pad area do not result in projected information on the projection surface. At step 208, a determination is made of whether a change has been made to the screen locker, such as the addition or removal of touch restrictions. If not, the process returns to step 206 to continue monitoring for changes to the screen locker. If a change is detected, the process returns to step 202 to identify touch areas and redefined touch input responses.

Figure 22:
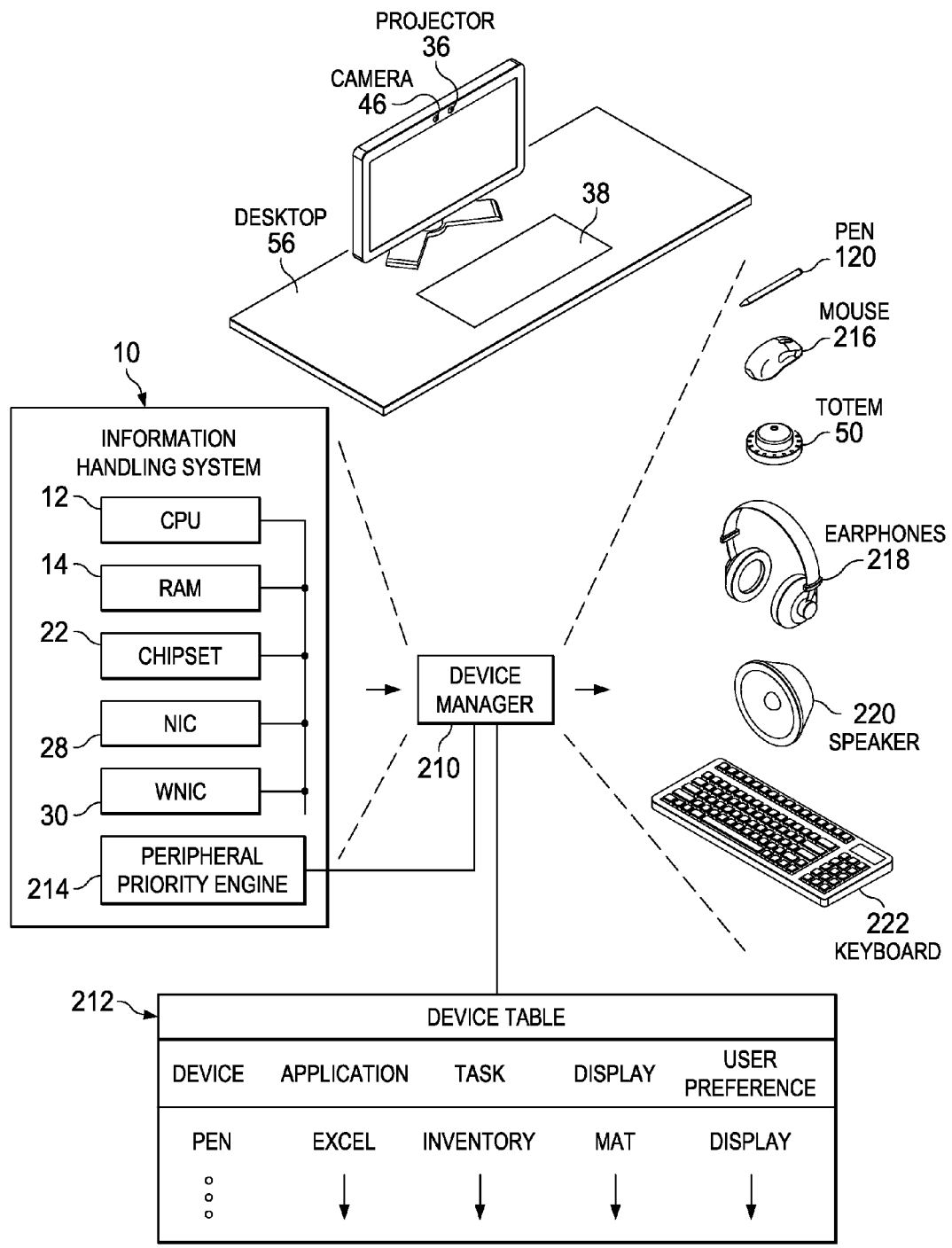
FIG. 22 a block diagram of an example embodiment of an immersed end user information handling system environment having contextually-suggested peripheral device recommendations.

Referring now to FIG. 22, a block diagram depicts an example embodiment of an immersed end user information handling system environment having contextually-suggested peripheral device recommendations. A device manager 210 executing on a processing resource, such as CPU 12 or chipset 22, interfaces with the one or more sensors to detect end user interactions at the immersed environment, such as with one or more of the plural applications that present visual information with display 34, projector 36 and capacitive mat display 38. Device manager 210 tracks peripheral device use by an end user for the plural applications in a device table 212. A peripheral priority engine 214 monitors peripheral use by an end user to interact with each of the plural applications and associates peripheral devices with applications based on end user preferences. Device manager 210 then applies the end user preferences from device table 212 to suggest to the end user a peripheral device for the end user to select to modify the end user interaction with the applications. For example, an end user who is performing inventory tasks with an EXCEL application on display 34 might have the user of a pen 120 and capacitive mat display 38 suggested to him as an alternative tool to interact with the inventory task based on other applications and interactions associated with the end user.

In the example embodiment, information handling system 10 has a number of different peripherals available, including pen 120 (such as a capacitive stylus sensed by capacitive mat display 38), wireless mouse 216, totem 50, earphones 218, speaker 220 and wireless keyboard 222. Different information handling systems 10 have different peripheral devices available depending upon the context of the information handling system, such as its physical location and its surrounding environment as detected by analysis of camera images. Device manager 210 tracks available peripheral devices with unique identifiers based upon wireless signals, physical location and images captured by camera 46. Different and independent sets of peripheral devices are often available depending upon information handling system context. End users tend to start activities with a selected device or peripheral and stick with the device or peripheral until a task is complete, even if other devices or peripherals are available that will provide more efficient interactions with an application performing a task. Device manager 210 maintains device table 212 to have a list of devices or peripherals available for performing a task or interacting with an application and peripheral priority engine 214 updates the available list to prioritize available devices or peripherals based upon end user tasks and applications. For example, a neural network or other statistical tool determines a probably based upon a detected context that an end user would prefer to use a different device or peripheral and suggests the device or peripheral to the end user if a threshold probability is detected. For instance, a pen totem may be suggested to perform illustrations instead of a mouse in use by an end user; a dual over ear headset may be suggested to perform a phone call instead of a single in ear mobile head set; or the single ear headset may be suggested near lunch time since the user is likely to leave a work space during a phone call. Device manager 210 provides oral cues, such as with speaker 220, display cues near an application in use, projected cues that point out and highlight a device or peripheral, such as with a projected arrow pointing at the peripheral, or other cues preferred by an end user.

Figure 23:
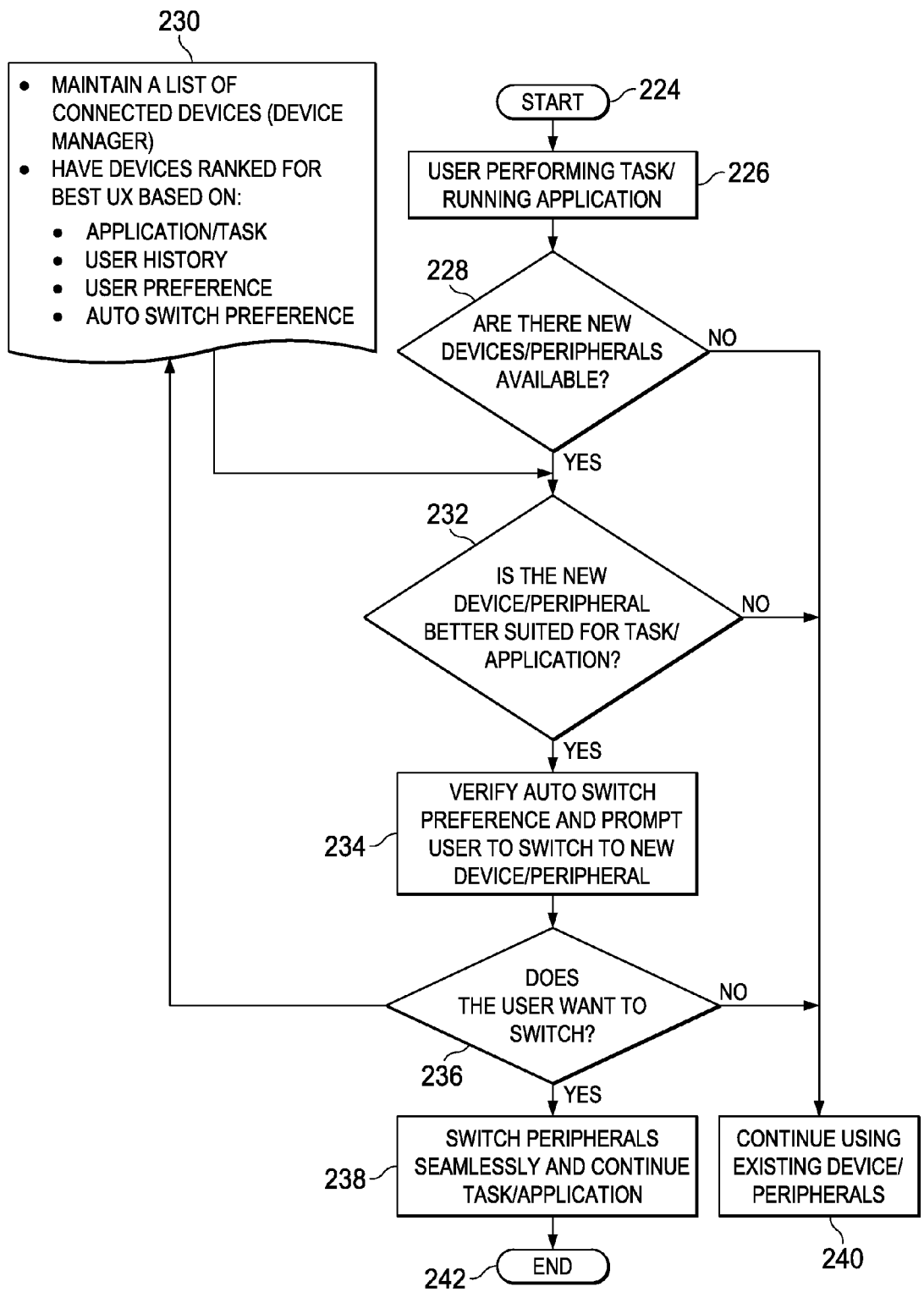
FIG. 23 depicts a flow diagram of a process for suggesting peripheral devices to an end user in an immersed information handling system environment.

Referring now to FIG. 23, a flow diagram depicts a process for suggesting peripheral devices to an end user in an immersed information handling system environment. The process starts at step 224 based upon a detected condition at the immersed environment, such as the selection of an application by an end user, changing from a first to a second application, or the starting/changing of a task by an end user with an existing application. At step 226, the process determines the task and associated application selected by the end user, including the peripheral selected by the end user to perform the task with the application. Examples of applications include word processing, spreadsheet, animation, accounting, multimedia or other types of applications. Examples of peripherals include a capacitive stylus pen, a mouse, a totem, an earphone, a speaker, a keyboard, a camera, or other types of peripherals. At step 228, the process determines the peripheral devices available in the immersed environment to interact with the active application and task. Available peripheral devices include devices detected by wireless communication, devices captured in an image from a camera of the immersed environment, and devices presumed present but not detected based upon a location and cached list of devices for the location. For example, an image captured by a camera detects passive devices, such as writing stylus pens that interact with capacitive mat displays. At step 230, a list of available peripheral devices for the immersed environment is maintained. The list is updated as peripheral devices are detected and may include presumed device based upon end user identity and position. The peripheral devices are ranked for selection at a user interface device based upon the application, task, user history, user preference, display device and an automated switch preference of the user for providing suggestions to the user. In one embodiment, analytics running in background adjust peripheral preferences based upon predicted user selections, such as by running a neural network or other predictive analytics that monitors user actions including application and peripheral selections.

If at step 228 an end user has a peripheral with a highest preference for the context detected in the immersed environment, such as a preferred peripheral for an active application in use by the end user, then the process ends at step 240 by continuing usage with the existing device or peripheral. If at step 228 an additional device or peripheral is available and associated with an end user's active application, the process continues to step 232 to determine if the new device or peripheral is better suited for the task and/or application in active use by the end user. For example, a comparison is made in the device table to determine if an unused peripheral has a higher ranking or preference for the application and/or task compared with a peripheral presently in use by the end user. If the presently selected peripheral has the highest preference, the process ends at step 240 by continuing use of the present peripheral. If a peripheral has a higher preference, the process continues to step 234 to verify the end user's preference regarding to automated peripheral switch notifications and the end user is provided with an appropriate notification regarding the availability of a peripheral device having a preference greater than a currently-selected peripheral device. At step 236, a determination is made of whether the end user desires to switch peripheral devices or continue with the presently used peripheral device. The end user's selection of peripheral devices is provided back to step 230 to update end user preferences. If at step 236 the end user elects to continue using the same peripheral device, the process ends at step 240. If the end user switches at step 242 to select a different peripheral, the application and/or task is automatically re-configured to interact with the new peripheral devices selection and the process ends at step 244. For example, selection by an end user of a peripheral having a capacitive device may automatically change a display of visual information to a capacitive mat display that interacts with the capacitive device.

Figure 24:
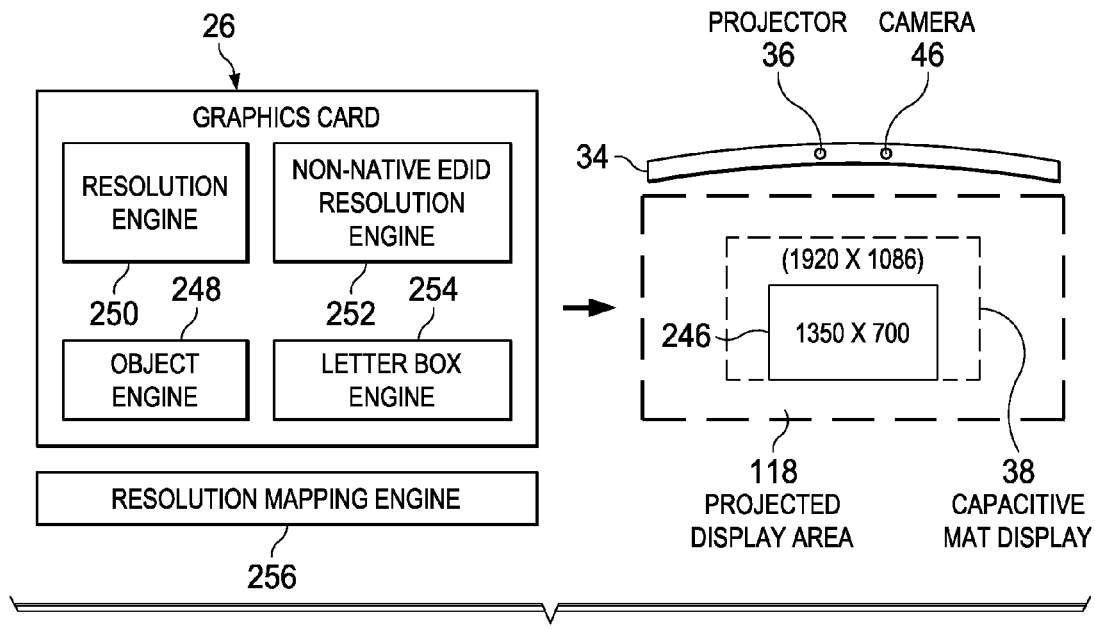
FIG. 24 depicts a block diagram of an immersed desktop environment having stored non-native resolution to rapidly adapt to a desired visual presentation configuration.

Referring now to FIG. 24, a block diagram depicts an immersed desktop environment having stored non-native resolution to rapidly adapt to a desired visual presentation configuration. Conventional displays 34 provide resolution of the display for presentation of visual information to a graphics system 26 with extended display identification data (EDID) stored in non-volatile memory of the display. In some instances, EDID includes a maximum resolution of the display and options for standardized smaller resolutions in case graphics system 26 does not support the maximum resolution. During startup, display 34 and graphics system 26 perform a handshake to determine a compatible resolution, and then graphics system 26 sends pixel information to display 34 at the agreed resolution. Once display resolution is initiated in an immersed environment, a resolution engine 250 changes the display resolution in some instances to present visual information adapted for an end user's viewing situation. For example, if camera 46 captures an image that indicates an object blocks an end user's view of display 34, mat display 38 or a projected display of projector 36, an object engine 248 provides resolution engine 250 with a boundary of unrestricted viewing so that resolution engine 250 can define an updated resolution. Graphics system 26 applies the updated resolution to send pixel values in the unrestricted viewing portion of the display device effected by the object. Resolution engine 250 dynamically changes the resolution of content as well as the location of content so that the overall presentation of visual images provides the user with an optimized presentation of information.

As an example, resolution engine 250 responds to a blocking object by either letter boxing or by a dynamic mode change. A letter box engine 254 assigns a black value to pixels that resolution engine 250 determines to be blocked and thus should not have content. If letter boxing is applied, the non-black pixels continue to present content while the black pixels appear unused to the end user, and resolution engine 250 presents content in the non-black pixel locations. Resolution engine 250 decides whether to decrease content size to fit in the smaller area and which portion of content, if any, to stop displaying. If resolution engine 250 has a dynamic mode change response, then non-native EDID resolution engine 252 determines a non-standard timing to apply to the content. Non-native resolution applied by resolution engine 250 results in pixel values dropped from the display scan, such as by not sending pixel values to pixels of a display in a blocked portion of a display. Non-standard timing to support non-native resolution is referred to as a display mode and burdens graphics system 26 by selecting content for presentation and developing adapted pixel values to forward to active display pixels. As graphics system 26 processes display mode requests, a user experience may degrade with interruption or hesitation of presentation of displayed information.

In order to provide a more rapid adaptation of presented visual information to an immersed environment, a resolution mapping engine 256 characterizes non-native EDID resolutions based upon the context in which the non-native EDID resolutions are generated and stores the non-native EDID resolutions in display EDID as a display mode. For example, if capacitive mat display 38 has a standard high definition resolution of 1920×1086 pixels adapted to a non-standard resolution of 1350×700 pixels due to a coffee cup place on mat display 38, resolution mapping engine 256 stores the non-standard resolution in EDID of capacitive mat display 38 along with an identifier. If a similar context is subsequently detected at capacitive mat display 38, resolution mapping engine 256 detects the context, finds the context similar within a defined threshold, and then applies the stored non-native EDID resolution stored in EDID of capacitive mat display 38 to present the visual information. Thus, for instance, if an end user places a coffee cup in roughly the same location of projected display area 118 every morning, resolution mapping engine 256 applies the associated non-native EDID to projector 36 for projection in projected display area 118 so that resolution engine 250 does not have to repeatedly generate similar non-native display resolutions for adapting to blocking of the same projection area. Resolution mapping engine 256 determines context for association of objects with non-native display resolutions based on available sensors that detected contextual conditions of the immersed environment, such as cameras that capture images, capacitive sensors that detect touch, infrared emitters that generate structured IR light or keyboard touch IR light to support camera operations, or wireless sensors that identify nearby objects and their relative position. In one embodiment, non-native resolutions are performed at only an affected section of a display. For example, plural windows present visual information in plural locations so that non-native resolutions are applied to move only those windows impacted by the blocking of the display while other windows continue to present information as before.

Figure 25:
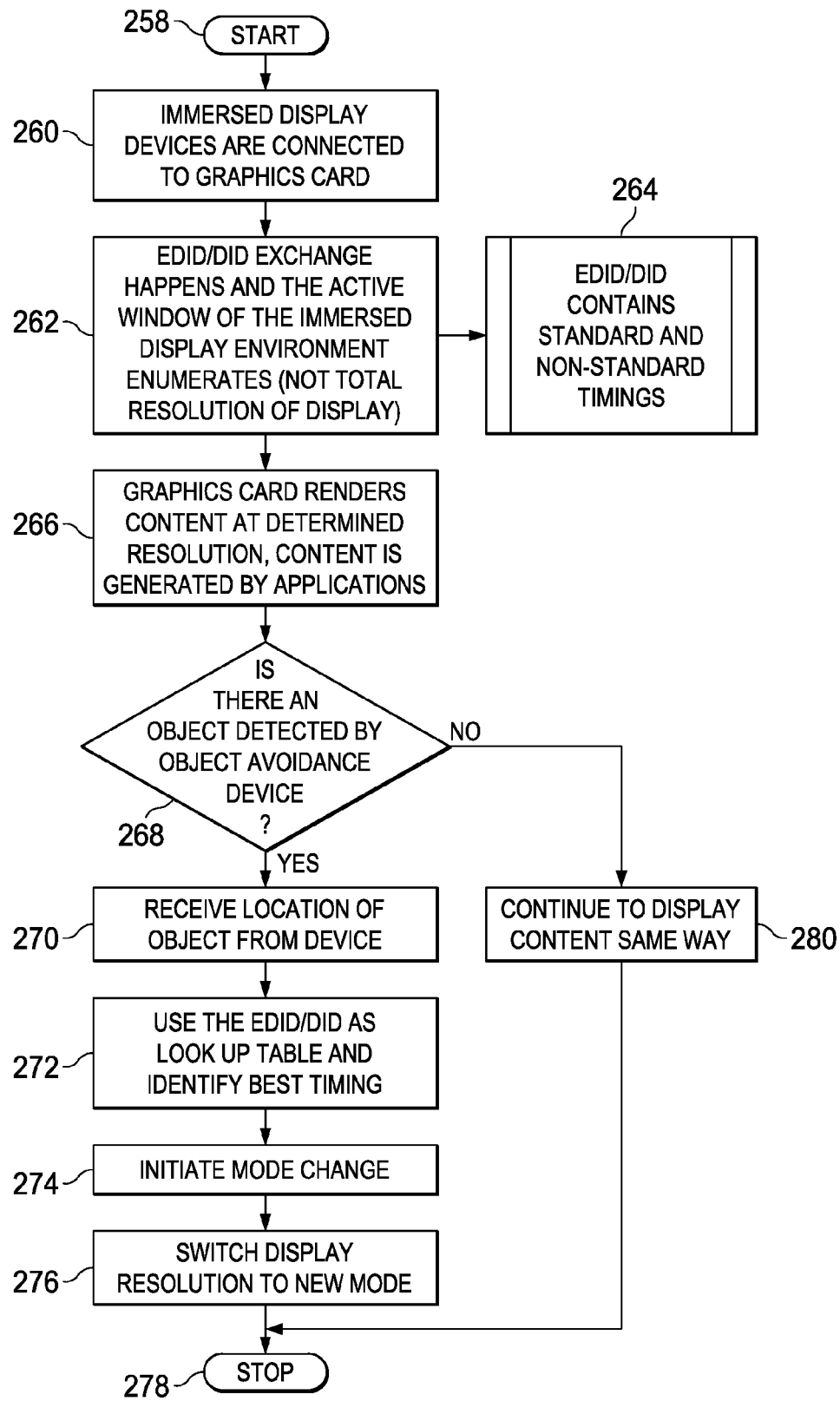
FIG. 25 depicts a flow diagram of a process for rapid adoption of non-native resolution presentation of visual information based upon a sensed context at an immersed information handling system environment.

Referring now to FIG. 25, a flow diagram depicts a process for rapid adoption of non-native resolution presentation of visual information based upon a sensed context at an immersed information handling system environment. The process starts at step 258 at initialization of an immersed display environment, such as with power up of an information handling system or activation of a display device. At step 260, immersed display devices are connected to the graphics card of the information handling system. At step 262, an EDID/DID exchange is performed in a standard manner to provide display device capabilities from the display device to the information handling system. As is depicted at step 264, the EDID/DID information contains both standard resolution timing supported by the display and non-standard resolution timing stored in the display for non-native presentation of visual information from previous interactions with the immersed environment. The non-standard timing information includes parameters that define context during which the non-native resolutions were generated. For example, the EDID for the non-native resolution may include values that indicate the boundary of the display that was blocked by an object. As another example, the EDID for the non-native resolution may include a unique identifier for the graphics system that created the EDID entry. At completion of steps 262 and 264, the immersed environment presents visual information at active windows of the immersed environment enumerated to adapt to the context sensed at the immersed environment based upon available EDID settings. For example, if the sensed context indicates less than all display areas should include visual information presentation, the graphics system enumerates visual information for presentation at less than all available display area.

At step 266, the graphics system renders content at the determined resolution in the active portions of the immersed display environment, such as non-blocked portions of the displayed area. For example, the graphics system uses non-native resolution and non-standard timing to present visual information at less than all available pixels of at least one display device and provides the reduced display area to applications that generate the visual information. The applications then adjust presentation of the visual information to desired content in available pixel locations. At step 268, a determination is made of whether an object is detected by an object avoidance device, such as a camera and matching algorithm running on the information handling system that identifies display areas that are blocked by the object. If no objects are detected, the process continues to step 280 to continue presenting information in the same manner. If an object is detected at step 268, the process to step 270 to receive the location of the objected detected by the sensing device. At step 272, EDID/DID is referenced to look-up and identify any stored non-standard display resolution settings that match the context created by the detected object. If a stored EDID/DID setting does not exist that provides an adequate match, the graphics system generates a non-standard resolution and stores the non-standard resolution for future reference. At step 274, a mode change is initiated to present visual information adapted to the sensed context, i.e., without having the visual information blocked by the sensed object. At step 276, the display of visual information is switched to the new display mode and, the process stops at step 278.

Figure 26:
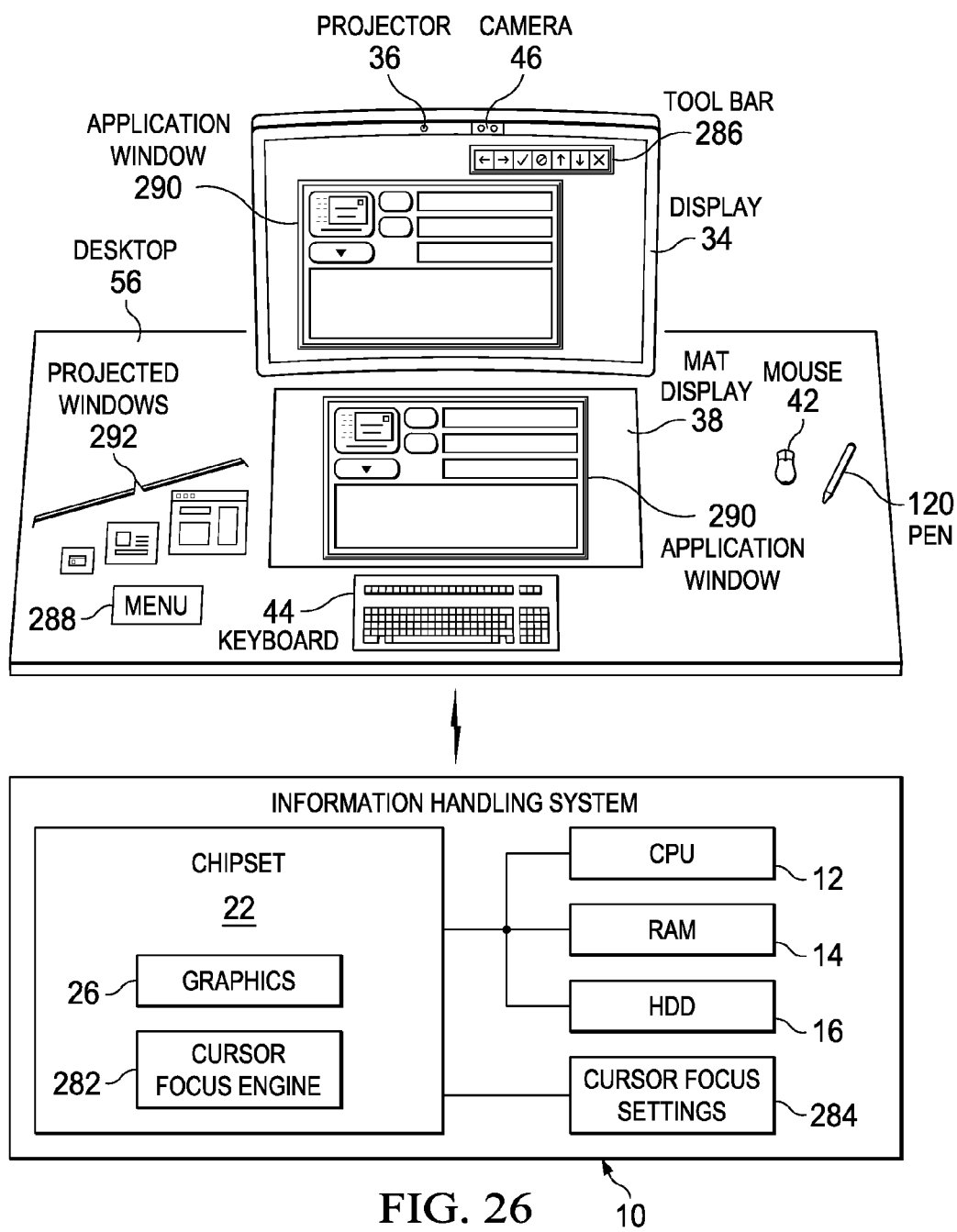
FIG. 26 depicts a block diagram of a system for managing cursor focus in an immersed environment having multiple displays that present visual information and accept end user inputs at the cursor.

Referring now to FIG. 26, a block diagram depicts a system for managing cursor focus in an immersed environment having multiple displays that present visual information and accept end user inputs at the cursor. Conventional multi-display environments have cursor focus managed by an operating system to remain active in the window having the most recent indirect or direct input click. Conventional operating system constructs define only one area or window to have focus or control at a time during normal operational use of an information handling system so that typed inputs enter the application of the identified active window. One result of this approach is that an end user typically must click on a window with a mouse to indicate a selection of an active application and then enter inputs interpreted as data for the active application, such as keyboard or mouse inputs. To reduce unnecessary end user inputs, a cursor focus engine 282 automatically determines a cursor focus based upon immersed environment context and applies the automated cursor focus to direct inputs to an appropriate application active at a window having the focus. In one embodiment, cursor focus engine 282 defines applications to receive inputs by applying a most recent end user input and at least one additional condition to direct inputs to an application other than the most recent application to receive end user inputs on at least some occasions. The at least one additional condition may include conditions detected by a camera, such as a user's position, eye focus, hand placement, objects in the user's hands (i.e., a capacitive pen stylus), etc. . . . . Alternatively, a probabilistic approach is taken in which cursor focus snaps to a window and/or application that the end user most likely will next desire to use for inputs, such as a probable cursor focus based upon the applications involved, the display devices involved, the input devices involved, the type of input made by the end user, etc. . . .

Cursor focus engine 282 runs as embedded code of chipset 22, such as in a graphics system 26, however, may run on alternative processing resources including distributed in part across various display devices. An end user provides cursor focus settings 284 to modify operation of cursor focus engine 282 as desired. In one embodiment, cursor focus engine 282 includes predictive algorithms, such as a neural network, to aid in determining a cursor focus desired by the end user and stores the results in cursor focus settings 284 for rapid rules-based cursor focus selection. An example of a user setting is an input with a mouse that clicks and holds on a selection for at least a predetermined time to indicate that the cursor focus should snap back to a previous window and/or application after the input. Another example is an automated or manually set time during which a cursor focus will remain active in each of different windows or applications. For instance, an email application will remain active for the cursor focus if the user makes a second input to the email application within a predetermined time of a first input. Thus, a user who clicks an email tab to read the email without responding will have cursor focus snap back to a previous application, while a user who hits reply or double clicks to pop out the email will have cursor focus remain in the email application. Another example of a user setting is an input to a window and/or application that defaults to snap back cursor focus to a previous application. In the example embodiment, a toolbar 286 is presented on display 34 and a menu 288 is projected by projector 36 on desktop 56. Toolbar 286 and menu 288 provide global inputs for plural application windows 290 without retaining cursor focus after an end user selection. For instance, a user who selects a font from toolbar 286 while in a word processing application will have the font applied to the word processing application with a snap back of cursor focus to the word processing application after the font selection.

As an example of operation of automated cursor focus determination, a user initiates applications windows 290 at display 34 and capacitive display mat 38, resulting in presentation of toolbar 286, menu 288 and projected windows 292 that are automatically presented based upon the user's context, such as a work or home location. Camera 46 captures the user's hands entering a typing position at keyboard 44, thus automatically placing cursor focus to the application window 290 of display 34 so that typing inputs are made at the application presented by display 34. The user stops typing and lifts his hands so that cursor focus engine 282 has an indication that the user intends to input to a different application. If the user picks up pen 120, cursor focus engine 282 automatically places cursor focus in capacitive mat display 38. If the user reaches for mouse 42, cursor focus engine 282 analyzes user eye position from images of camera 46 to place cursor focus on the application window 290 next viewed by the user. During inputs at an application window 290, a press to toolbar 286 temporarily focuses the cursor at toolbar 286 to accept a font change for the most recent application window 290 having cursor focus and then cursor focus automatically returns to that most recent application window. Over time, a neural network of cursor focus engine 282 develops a predictive algorithm for cursor focus location based upon end user interactions with application windows 290, various tools and peripherals so that cursor focus engine 282 automatically focuses a cursor at a next location of interest to the end user.

Figure 27:
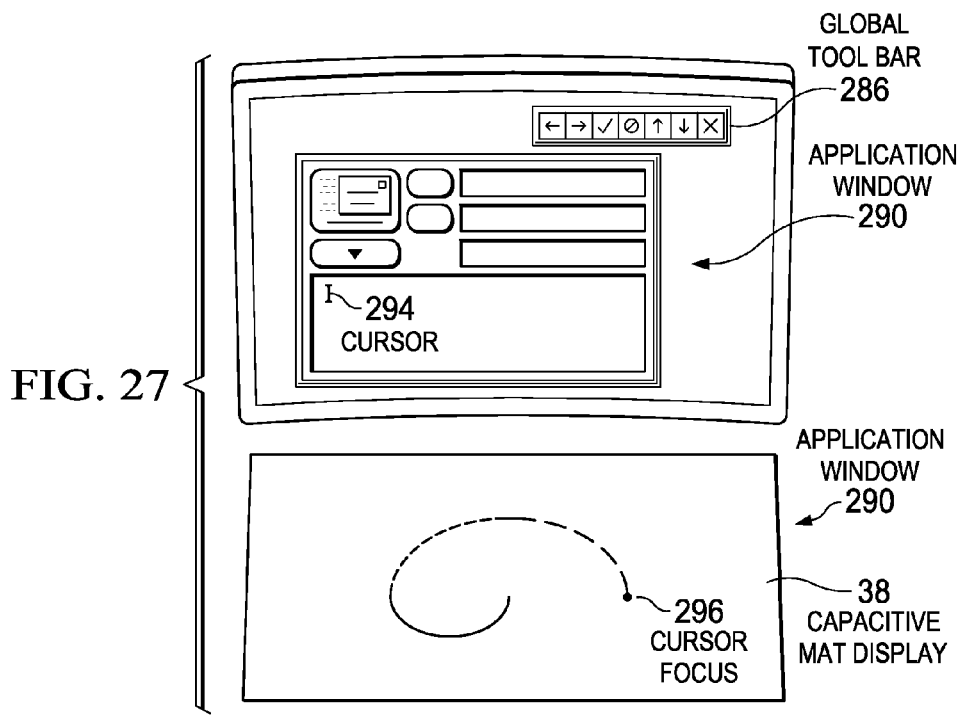
FIG. 27 depicts an example embodiment of cursor focus snap back between a display and a capacitive mat display.

Referring now to FIG. 27, an example embodiment of cursor focus snap back is depicted between a display 34 and a capacitive mat display 38. An end user has a drawing application open and accepting inputs at capacitive mat display 38 and then, for example, the cursor is moved to toolbar 286 to make a settings change, such as color or font, for inputs made to capacitive mat display 38. The user may actively be maintaining focus of the cursor with an indirect or direct input at capacitive mat display 38, while using a secondary input to make a settings change at toolbar 286. Cursor focus 296 automatically remains focused on the active position of capacitive mat display 38, while incorporating toolbar 286 input without the user having to reposition the primary cursor to continue the drawing. Automated cursor focus aids end users with managing cursor focus in a single application at a single display device, a single application presenting information across plural display devices, and plural active applications actively available to accept inputs. For example, in FIG. 27 a single application may present an application window 290 in display 34 and capacitive mat display 38 with an idle cursor 294 and an active cursor 296. In a scenario where two active applications are open, conventional operating system constraints require the user to click twice, once to make a next application in focus and a second time to interact with the control for the second application. Cursor focus engine 282 allows the user to activate a control in an application window 290 without having to make the application window top-level active first. User's exercise discretion and desired defaults of this concept is to define specific instances when a primary cursor remains active or when an alternative cursor should become active. For example, user actions could include: maintaining current behavior where the cursor loses focus, or using the secondary input to tap through toolbar options. These user-definable settings are managed via an operating system user-interface and stored in cursor focus settings 284.

Figure 28:
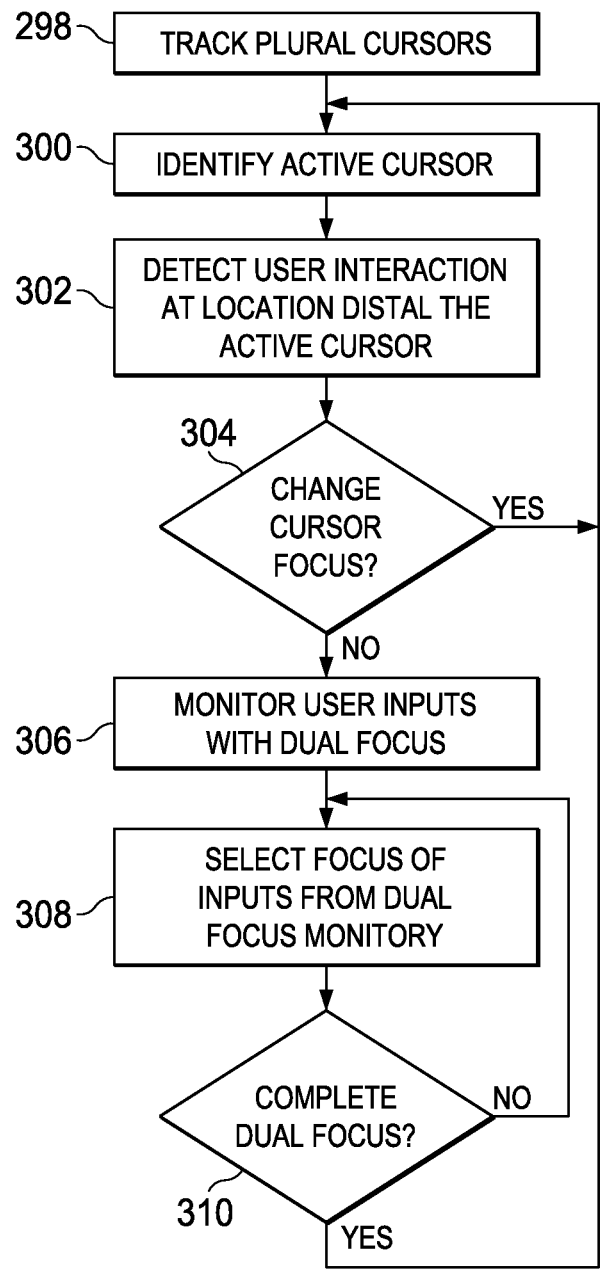
FIG. 28 depicts a flow diagram of a process for automatically establishing cursor focus based upon end user interactions with an immersed environment.

Referring now to FIG. 28, a flow diagram depicts a process for automatically establishing cursor focus based upon end user interactions with an immersed environment. The process starts at step 298 by tracking plural cursors in plural application windows of the same and/or different applications. Cursors may be presented to an end user whether or not active or, in one embodiment, only an active cursor is presented. Alternatively, an active cursor may be presented with a distinguishing feature, such as distinguishing flashing, color or shading relative to non-active cursors so that an end user may verify the active cursor after an automated focus operation before initiating inputs at an input device. At step 300, an active cursor is identified, such as by a default setting, an end user input, or an automated focus operation based upon an immersed environment context. At step 302, user interactions are detected at locations distal the active cursor, such as at a different application, different display or a projected display. At step 304, a determination is made based upon the context of whether to change the cursor focus. For example, a press and hold by the user may indicate a change of cursor focus to the location of the press and hold or may indicate the opposite. Other factors may be applied to make a determination of a cursor focus change as set forth above. If a change in cursor focus is determined, the process returns to step 300.

If at step 300 a change in cursor focus is not performed in response to detection of a user action at a location distal the active cursor, the process continues to step 306 to monitor user inputs with a dual focus. Monitoring user inputs includes monitoring the type of inputs made at the distal location and end user interactions after the inputs, including conditions sensed in the immersed environment as set forth above. At step 308, a cursor focus is selected based upon end user inputs received during the dual focus monitoring. For example, although the selection of a location distal an active cursor location does not change the cursor focus to that distal location at step 304, dual focus monitoring at step 306 verifies that retaining cursor focus is the result desired by the end user. If user inputs indicate that a user intended a change of focus, then at step 310 the focus changes and the process returns to step 300. If user inputs indicate that the user did not intend to change the focus the process continues to step 308 to continue with the retained primary cursor focus and monitoring for a predetermined time interval. For example, if the end user makes repeated inputs that indicate a preference for the retained cursor focus, dual cursor focus monitoring may halt. As an example, if a user is drawing on a capacitive mat display when a mouse click is made at an email of a main or projected display, subsequent inputs by the user will focus at the drawing application unless analysis of the inputs indicates that the user is typing an email. If the user is typing an email, a buffer with the email inputs will shift focus to the email application so the user has the inputs at the intended application with only a slight delay in the output of the visual images.

Figure 29:
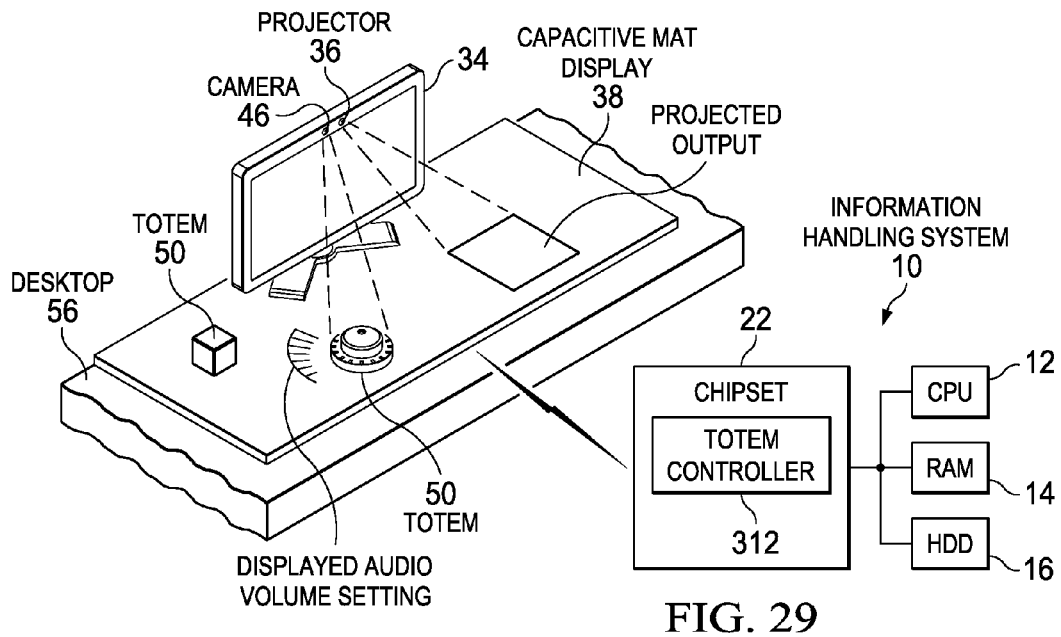
FIG. 29 depicts a side perspective view depicts a system for interacting with totem devices 50 disposed at a capacitive mat display 38 placed on a desktop 56.

Referring now to FIG. 29, a side perspective view depicts a system for interacting with totem devices 50 disposed at a capacitive mat display 38 placed on a desktop 56. Totems 50 interact with information handling system 10 under the management of a totem controller 312, such as firmware instructions executing as part of a BIOS of chipset 22 or otherwise distributed to processing resources of the immersed information handling system environment. In the example embodiment of FIG. 29, totems 50 provide inputs based upon user manipulation detected at capacitive mat display 38 or by images of camera 46. Totem controller 312 identifies totems 50 based upon an appearance captured by camera 46 or, alternatively by a unique footprint of a totem 50 detected with capacitive mat display 38. For example, totem 50 includes identification codes on a bottom surface that rests on capacitive mat display 38 to provide identification information to totem controller 312 that is applied to discern the meaning of inputs at the totem 50. Some examples of identification features used to define an identifier for a totem 50 include varying combinations of feet or other features that have identifiable capacitive values, pad sizes, pad shapes, pad patterns and capacitive oscillation frequencies. By including identifiable features on a totem 50, functionality of totems 50 may be classified and stored at totem controller 312 with totem specific interactions to include sensed pressure placed on a totem, hover associated with a totem, orientation of a totem or other "smart" features enabled on "dumb" devices that do not include processing capabilities. As an example, a totem has plural feet arranged in a uniquely identifiable geometric pattern with each of the plural feet having a unique capacitance value so that, when placed on a capacitive surface, the geometric pattern and capacitive values provide identification of the totem as well as the totem's orientation. The capacitive surface senses totem feet as touching or as "proximate" but not touching if a capacitive value is detected without a touch at the capacitive surface, such as in a "hover" configuration. Pressing on a totem with different pressures produces different capacitive values at the totem feet so that an amount of pressure on different sides distinguishes relative end user inputs. These and other variations in capacitive values sensed at a capacitive surface provide flexibility for end user inputs with a "dumb" or passive totem device that does not include processing components or power to actively interact with an information handling system. Alternatively, some smart features may be included with processing components powered by battery of electromagnetic resonance (EMR) provided from capacitive mat display 38.

Figure 30A:
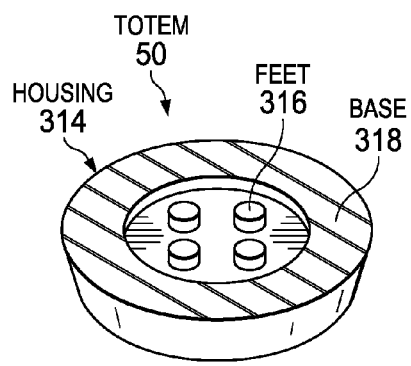
FIG. 30A depicts a bottom view of a totem as an example of capacitive feet that rest on or proximate to capacitive mat display.
Figure 30B:
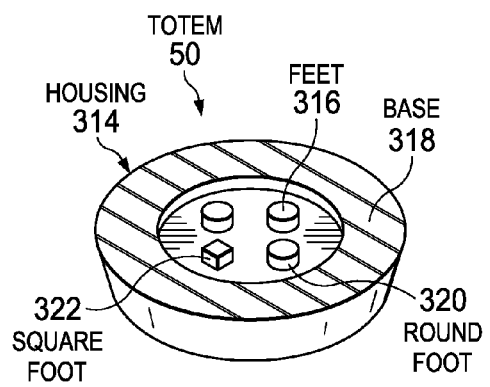
FIG. 30B depicts a bottom view of a totem as an example of capacitive feet that rest on or proximate to capacitive mat display.

Referring now to FIGS. 30A and 30B, a bottom view of a totem 50 depicts an example of capacitive feet that rest on or proximate to capacitive mat display 38. In the example embodiment, a housing 314 has a puck shape with four feet 316 disposed in a square perimeter. A base portion 318 is disposed in a circular pattern around feet 316 with an outer perimeter at the outer surface of housing 314 and an inner perimeter near feet 316. Totem controller 312 senses touches a capacitive mat display 38 to determine the positions of feet 316 relative to each other and to base 318. In some instances, the detected positions of feet 316 provide a unique identifying feature that totem controller 312 associates with stored totem functionality, such as by identifying a totem as a mouse totem, volume knob, brightness knob, animation rotation totem or other specified function. The example embodiment of FIG. 30B depicts a round foot 320 and a square foot 322 disposed at the bottom surface. In alternative embodiments, alternative shapes at the foot bottom surface may be used to provide identification of totem 50, including triangle shapes, oval shapes, octagon shapes, etc. . . . . Totem controller 312 also applies the different shapes to determine an orientation of the totem 50 on the capacitive mat display 38, such as an orientation of square foot 322 relative to round feet 320 and coordinates determined on desktop 56 as set forth above. Thus, for instance, totem controller 312 determines the position of a rotating knob, such as for selecting volume or brightness, based upon the relative position of square foot 322 and presents a user interface on capacitive mat display 38 that shows the knob setting proximate to the knob.

In various embodiments, various different types of identifying characteristics may be included in a totem 50 to identify both a type of function for the totem and to uniquely identify a totem. In one embodiment, one or more feet of a totem 50 are replaceable to aid an end user in uniquely identifying totems 50 at the end user's desktop 56. In another embodiment, the position of feet 316 relative to each other on totem 50's bottom surface change to aid in unique identification. For example, moving one foot 316 position relative to other positions defines a different shape perimeter established by the feet 316 to provide identification by the perimeter shape and/or size. In combination with or separate from different arrangements of feet 316, different values of electro-magnetic resonance of feet 316 are detected by totem controller 312 to determine a unique pattern of capacitance for the totem 50 feet 316 as an identifying feature, such as with unique patterns of feet positions and feet capacitance values. Further, the capacitance values provide feedback for determining a foot 316 proximity to capacitive sensors of capacitive mat display 38, such as in a hover detection and press detection that determines end user pressure on a totem 50 upper surface. Further, feedback from camera 46 may be applied by totem controller 312 to associate end user inputs at a totem 50, including hover and press inputs. For example, capture of the user's hand position relative to a totem 50 verifies intended end user inputs at a totem 50 as opposed to unintentional touches or stray detected capacitance values.

Figure 30C:
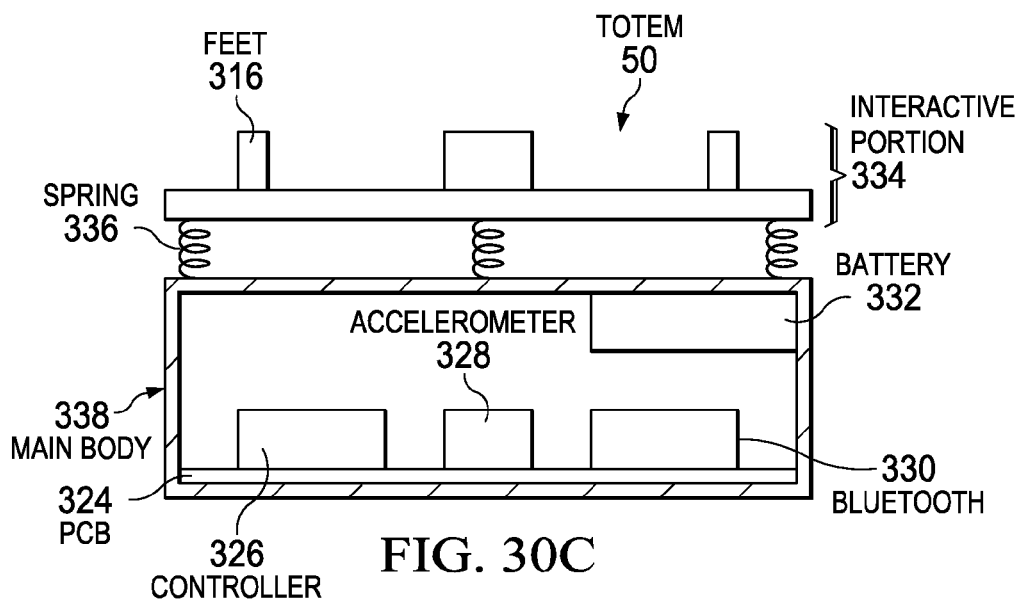
FIG. 30C depicts an alternative embodiment of a totem having an interactive portion that moves relative to a main body to provide additional input feedback related to the totem.

Referring now to FIG. 30C, an alternative embodiment of a totem 50 depicts an interactive portion 334 that moves relative to a main body 334 to provide additional input feedback related to the totem 50. Main body 334 couples by flexible springs 336 to interactive portion 334 so that pressure applied by an end user to main body 338 is reflected through feet 316 in different manners based upon transfer of the pressure through springs 336. For example, a user tilt of pressure from one side of totem 50 to the other side results in lifting of a side foot for a reduced capacitance value detected at that side. Proximity detection of a height of a foot 316 over a capacitive sensor determines an amount of tilt at totem 50. Specific physical feel at a totem 50 may be varied by changing the shape of a center foot 316, such as by having a curved bottom surface, or by varying the shape of feet 316 at the outer perimeter of a tip so that a degree of tip is discerned from the relative positon of feet 316. For instance, feet 316 may tilt away from the center of totem 50 in response to increased pressure, such as a tilt in a sideward direction, that increase a distance of a foot 316 for the center of totem 50 as measured by capacitive sensors. Tilting inputs at a totem may provide gaming functions, such as similar to a joystick, mouse functions, or other types of inputs meant to communicate position from an end user to an information handling system. In addition, totem 50 of the example presented by FIG. 30C depicts embedded smart functionality communicated wirelessly to an information handling system. For example, a printed circuit board 324 supports a controller 326, accelerometer 328 and Bluetooth module 330 powered by a battery 332, which is charger in turn by EMR effects from a capacitive mat display 38. Buttons, accelerations or other inputs transferred wirelessly to an information handling system enhance totem "dumb" functionality and/or replace totem functionality when a capacitive sensor is not available to detect end user manipulation of a totem.

Figure 30D:
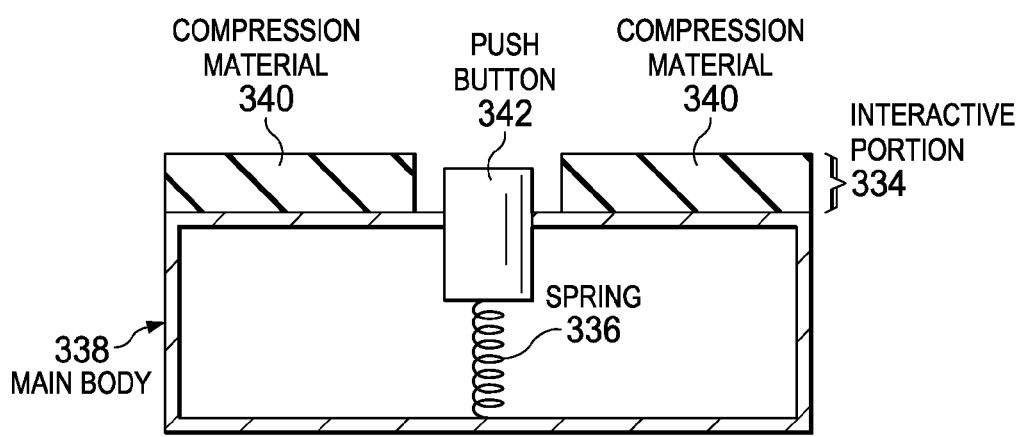
FIG. 30D depicts another example embodiment of a totem with an interactive portion that translates end user manipulations into inputs at a capacitive mat display or other capacitive sensor.

Referring now to FIG. 30D, another example embodiment of a totem 50 is depicted with an interactive portion that translates end user manipulations into inputs at a capacitive mat display 38 or other capacitive sensor. Totem 50 has a bottom surface made of a compression material 340 that compresses and thins when pressure is applied at the top surface of totem 50. For example, compressible material is a silicon based plastic that has elasticity to return to an original shape after deformation from pressure applied by an end user. Compressible material 340 provides end user inputs both by the relative area covered by material 340 as it compresses against a capacitive sensor surface and by contact of a push button 342 to the capacitive sensor surface as the compression material 340 thins. For example, pressing down to bring push button 342 into contact with a capacitive sensor surface provides a push button function such as for a mouse. When not pressed down, push button 342 defaults to a "hover" indication by having a proximity detected by capacitive sensors for the push button relative to the totem bottom surface that is in physical contact with the capacitive sensors. As another example, a greater surface area pressed against the capacitive surface on a right side of totem 50 indicates a push button for a right mouse button input. Similarly, totem 50 provides a joystick function by indicating a direction input as the greatest surface area of the compression material 340 on a capacitive surface, such as may happen if a user presses on one side of totem 50, and a push button function if push button 342 contacts the capacitive surface. Such as joystick function translates to animation programming by defining animated figure motions with inputs related to the surface area of the totem that contacts the capacitive sensor surface.

Figure 30E:
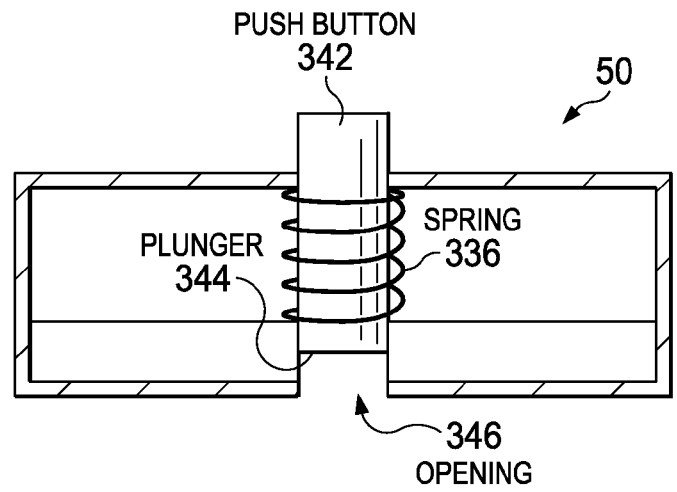
FIG. 30E depicts another example embodiment depicts a totem 50 having an interactive portion that moves relative to a main body.

Referring now to FIG. 30E, another example embodiment depicts a totem 50 having an interactive portion that moves relative to a main body. In this example embodiment, the interactive portion is a push button 342 extending upwards from the top portion of totem 50 and biased upwards with a spring 336. Push button 342 presses as a plunger 344 through the totem body to press against a capacitive sensor located in a surface below and accessible through an opening 346. An end user indicates a touch input by pressing on push button 342 to bring it in contact with the capacitive sensors of a capacitive mat. In various embodiments, a push button and plunger input device may be added in multiple locations in combination with other types of interactive portions. Multiple push button and plunger assemblies have each push button input distinguished by its position relative to the main totem body or with a distinct foot characteristic where plunger 344 meets the capacitive sensor, such as the identification characteristics described above. In one embodiment, push button 342 moves laterally relative to the main housing of totem 50 to provide joystick inputs. The lateral position relative to the sides of opening 346 determine the amount of joystick input with rotation provided about a rotation point of the plunger coupled to the main body within the opening.

Figure 30F:
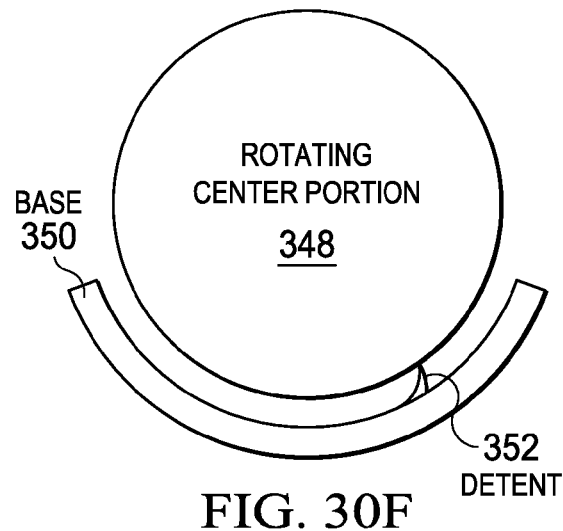
FIG. 30F depicts an upper view of another example of a totem having a rotating center portion that rotates relative to a base resting on a capacitive sensor surface.
Figure 30G:
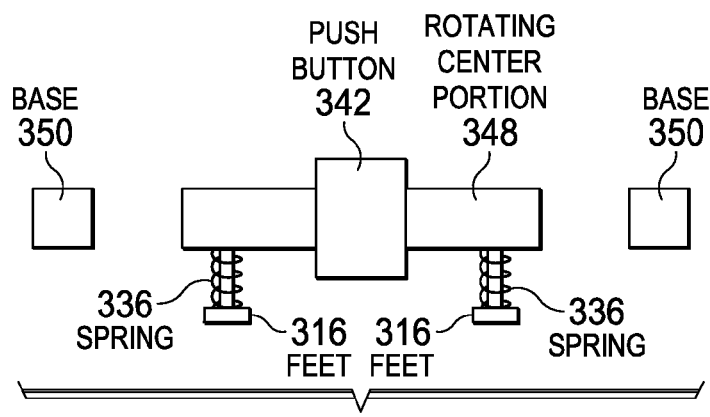
FIG. 30G depicts an example totem keyboard that adopts the plunger interactive device and foot identifiers described above for use to accept keyboard inputs.
Figure 30H:
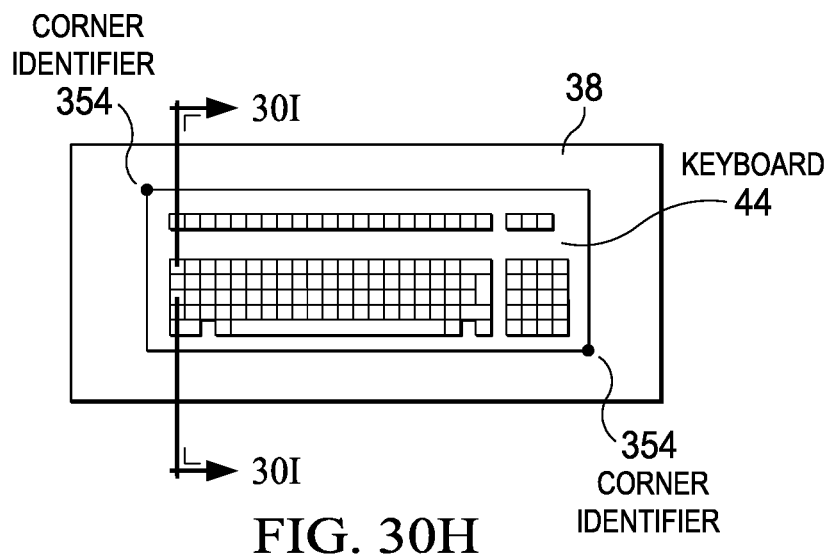
FIG. 30H depicts a blow-up view of a key from a totem keyboard.
Figure 30I:
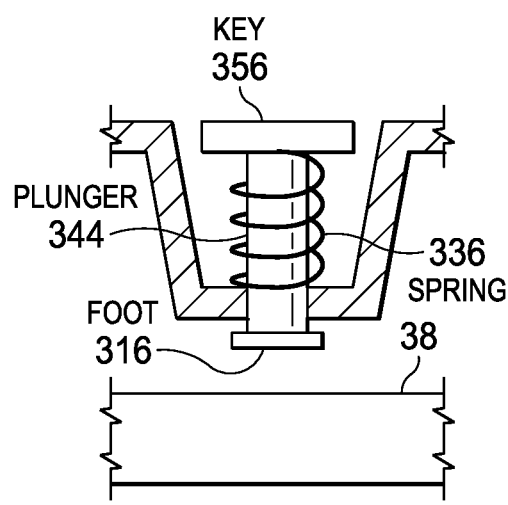
FIG. 30I depicts another example embodiment of a keyboard totem.
Figure 30J:
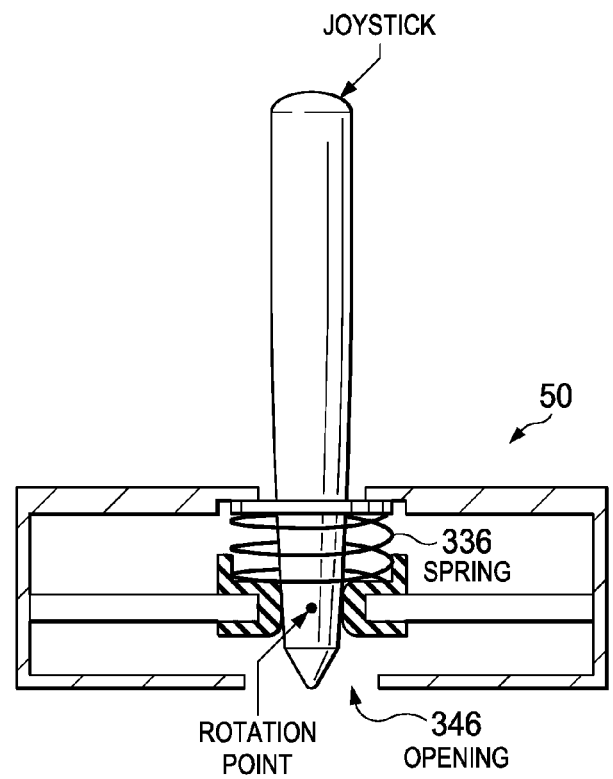
FIG. 30J depicts another example of a totem having a rotating center portion to provide joystick inputs at a capacitive surface.

Referring now to FIG. 30F, an upper view of another example of a totem 50 is depicted having a rotating center portion 348 that rotates relative to a base 350 resting on a capacitive sensor surface. For example, the example embodiment of FIG. 30F has a similar construction to embodiments depicted by FIGS. 30A and 30B except that the center portion holding the feet rotates relative to the outer portion. In alternative embodiments, the center position may rest on the capacitive sensing surface and the outer ring may rotate relative to the center position. A detent 352 disposed between rotating center portion 348 and base 350 provides user feedback of motion of the two portions relative to each other. FIG. 30G depicts the totem 50 of FIG. 30F in a side cutaway view to illustrate freedom of motion of rotating center portion 348 relative to base 350. In the example embodiment, feet 316 are disposed from rotating center portion 348 to contact a capacitive sensor surface and allow detection of the feet rotational position relative to base 350. A push button 342 is available on top of totem 50 to provide an input similar to that of FIG. 30E. Thus, functionality for "dumb" totems are added by various combinations of the interactive portions as set forth here. As an example, the embodiment depicted by FIG. 30F placed upon a capacitive mat display is recognized as an audio control totem, resulting in an audio control interface presented around the outer ring of the totem to indicate the state of the audio system. A user presses a push button to turn audio on or off, and rotates the ring to change audio volume. As the user changes audio settings, the capacitive mat display presents the settings proximate the totem.

Referring now to FIG. 30G, an example totem keyboard 44 is depicted that adopts the plunger 344 interactive device and foot 316 identifiers described above for use to accept keyboard inputs. Corner identifiers 354 provide position information of keyboard 44 on capacitive mat display 38 so that the position of keys 356 relative to corner identifiers 354 is available to a totem controller. For example, corner identifiers are a unique foot signature of one or more feet 316 that provide a precise position. Further, analysis of camera images allows confirmation of the keyboard position sensed by capacitive sensors and placed by the coordinate system described above. As a user presses keys 356, a foot 316 of each key hits a capacitive sensor surface to make an input. The identity of the key press is discerned by its position relative to corner identifiers 354 and/or unique identifying characteristics associated with each foot 316, such as capacitance, shape, etc. . . . . . Although the plunger 344 interactive model of FIG. 30G depicts a QWERTY type keyboard configuration, other types of input devices may use a similar structure, such as a number keypad.

Figure 31:
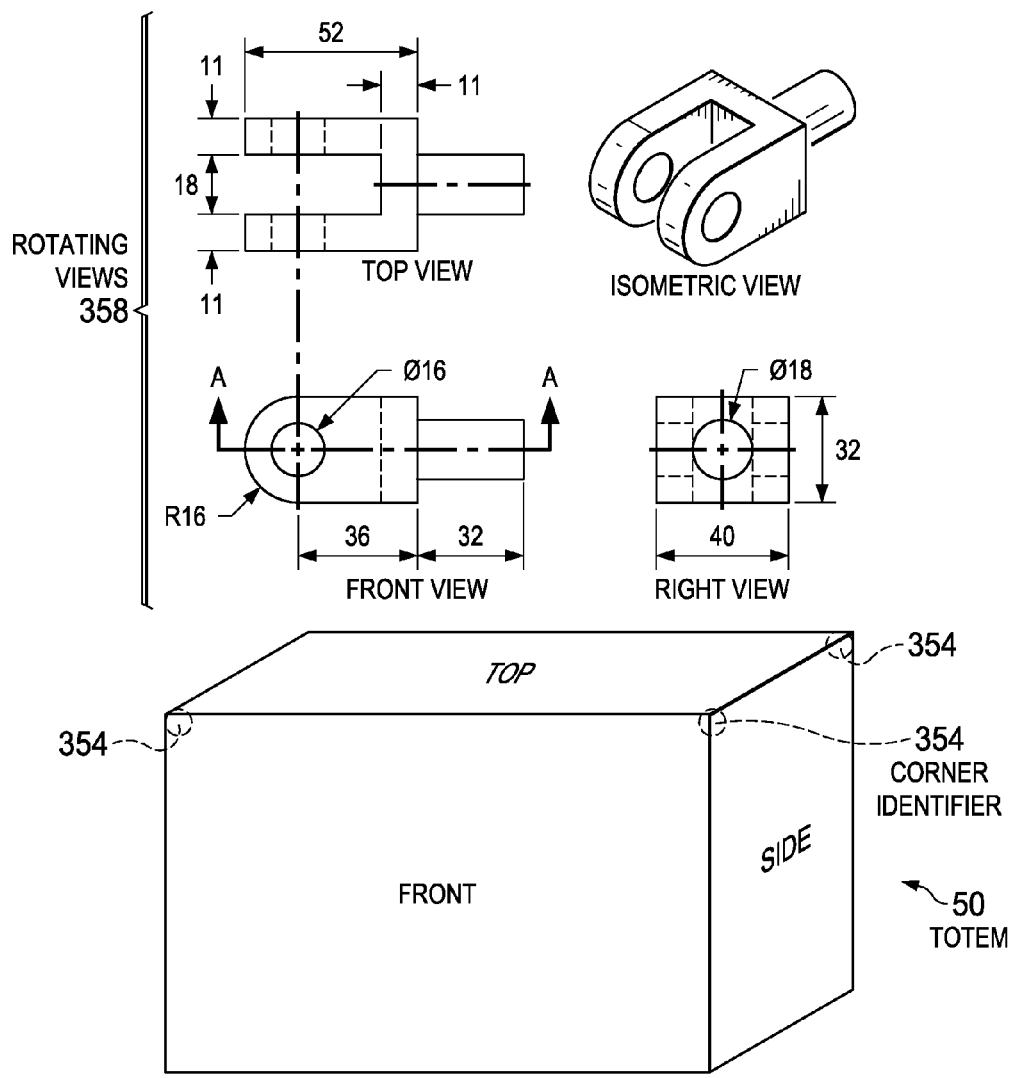
FIG. 31 depicts another example of a totem having a rectangular block shape.
Figure 32:
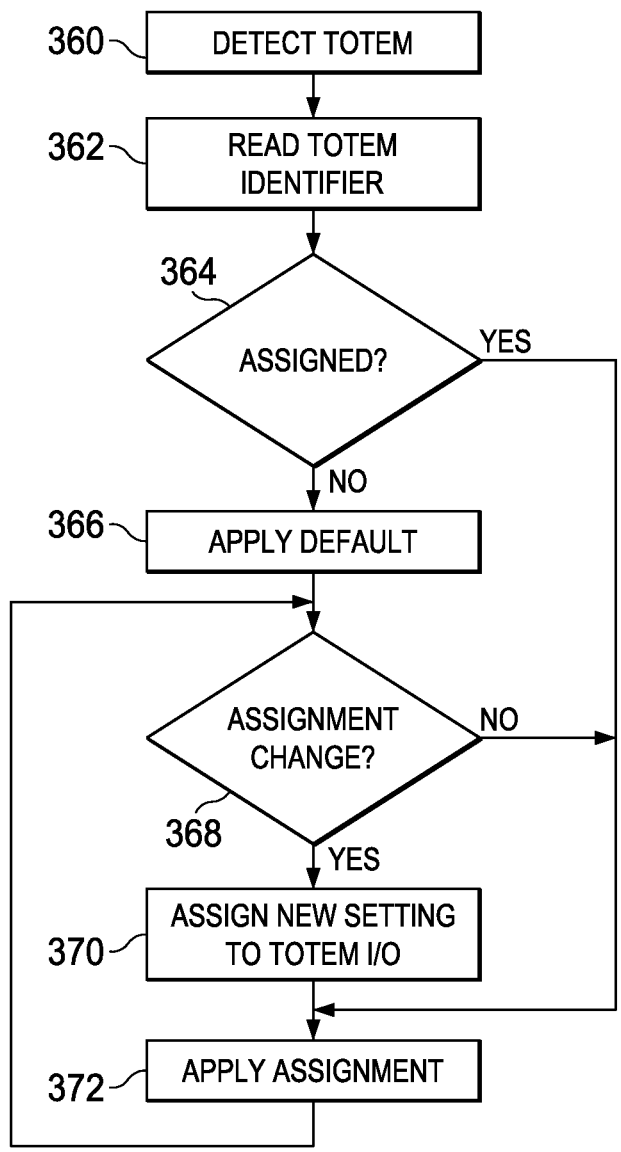
FIG. 32 depicts a flow diagram of a process for establishing a totem relationship with a function at an information handling system.

Referring now to FIG. 31, another example of a totem 50 is depicted having a rectangular block shape. An end user manipulates the position of block totem 50 to communicate orientation information to a totem controller for commanding rotating views 358 of an object presented by an information handling system display device. For example, if a user desires to change from a front view to a top view of a CAD image presented in rotating views 358, the user rotates block totem 50 so that the top side of totem 50 faces the user. Orientation information is provided by images captured by a camera or, alternatively, by identifiers embedded in totem 50 and sensed by capacitive sensors of a capacitive mat display on which block totem 50 rests. For example, each side of block totem 50 includes a corner identifier 354 so that capacitive sensors detect the side closest to or resting on the capacitive sensing mat. Proximity sensing of identifiers 354 provide approximate distance of a side portion from a capacitive sensor surface to show rotational motion and isometric views. In various embodiments, various types of identifying markings may be included in each side of block totem 50 to aid detection of orientation information. For example, identifying information may include markings distinguishable by a camera or capacitive touch sensor. Specific capacitance related markings or feet aid detection of distance measurements with proximity sensing to determine totem orientation when lifted or partially lifted off of a capacitive sensing surface, such as identifiable capacitive values, pad sizes, pad shapes, pad patterns and capacitive oscillation frequencies. The ability to sense proximity of specific portions of totem 50 to a capacitive mat display (including non-display capacitive sensors) provides a power tool for adding motion to animated figures presented by an information handling system interfaced with the capacitive sensors and aided by a camera view of totem 50. Although FIG. 32 presents totem 50 as a block tool to aid CAD drawings, in alternative embodiments different form factors may be used, including human models with identifiers 354 at specific body part locations. Indeed, a user may create a totem from virtually any item by addition identifiers 354 as desired.

Referring now to FIG. 32, a flow diagram depicts a process for establishing a totem relationship with a function at an information handling system. The process starts at step 32 with detection of a totem at an immersed environment, such as with a camera and/or a capacitive sensor. At step 362, the totem identifier information is read by the information handling system, such as by analysis of a camera image to capture unique markings on the totem or analysis of shape on a capacitive surface or other identifying features as set forth above. At step 364, the totem identification information is compared with known totem identifiers to determine if the totem is assigned to a function by the information handling system, such as with a preassigned function specific to the totem type or an existing assignment already applied to the totem. Totem assignments may include assignments to general functions, assignments to specific applications, and assignments of different functions to different applications. If an assignment exists, the process continues to step 372 to apply the existing assignment.

If no assignment exists for a totem, the process continues to step 366 to apply a default assignment based upon the type of totem identified. At step 368, a determination is made of whether to change an assignment applied to a totem. An assignment change may arise due to a user request or due to a contextual condition at the immersed environment that indicates a new use for an existing totem, such as opening a new application that initiates a search for a specific totem. If an assignment change is not automatically or manually selected, the process continues to step 372. If an assignment change is initiated, the process continues to step 370 to assign a new setting to the totem for providing input and output to the information handling system. At step 372, the totem assignment is applied to the totem so that the immersed environment totem controller will accept input and output based upon the assignment. In various embodiments, totem assignments provide direct user control of applications with physical manipulation of totems on an application specific basis. For example, a user can assign first and second mouse totems to first and second applications. When the user grasps the first mouse totem, inputs are directed to the first and application; and when the user grasps the second mouse totem, inputs are directed to the second application. Similar assignments may be applied to pens for applications or for functions within an application. For example, a first totem pen identifier results in a first color input to the application and a second totem pen identifier results in a second color input to the application, thus allowing the user to select colors with a natural input rather than performing selections through a menu. Further, totem identifiers may be broken down by application windows or by display device so that an end user can adjust input destinations by selecting a totem assigned to a destination.

Figure 33:
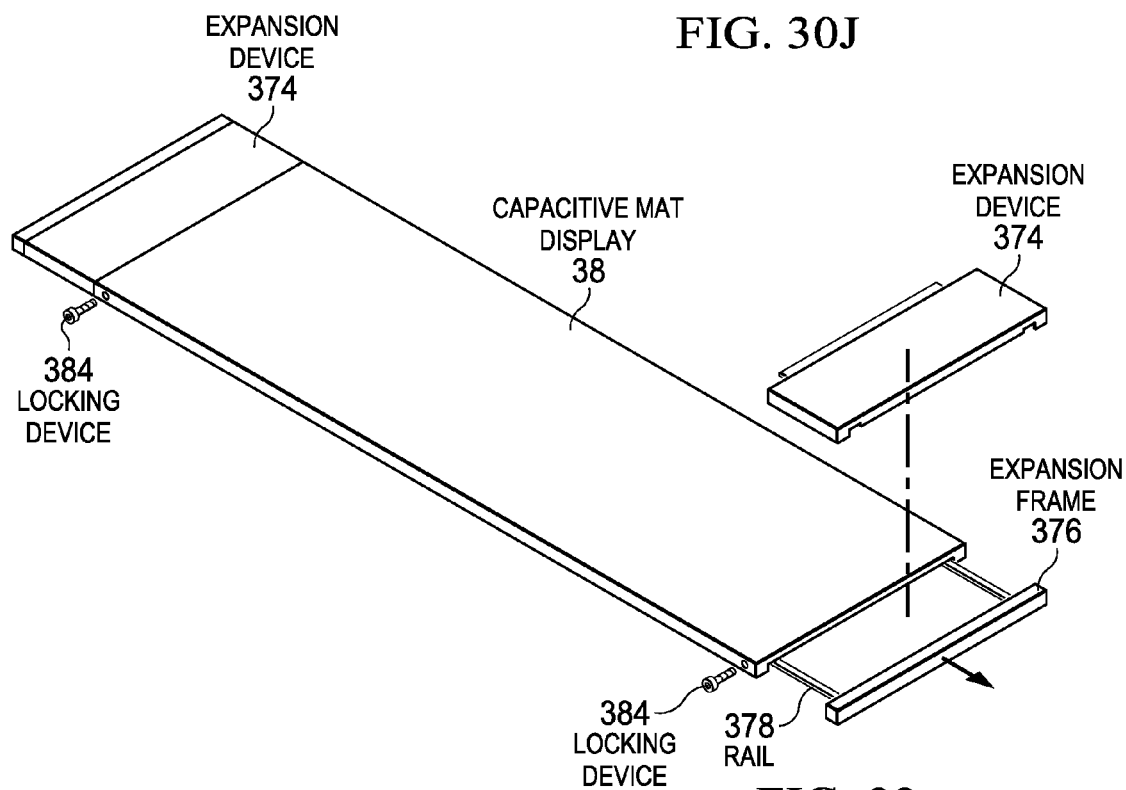
FIG. 33 depicts an upper perspective view of a capacitive mat display having interlocking modular expansion devices to provide additional surface area for presenting information, accepting touch inputs and charging devices.

Referring now to FIG. 33, an upper perspective view depicts a capacitive mat display 38 having interlocking modular expansion devices 374 to provide additional surface area for presenting information, accepting touch inputs and charging devices. Conventional desktop work surfaces have centered around keyboard and mouse environments. The immersed environment expands the horizontal work surface with a capacitive touch sensor surface, such as a capacitive mat display 38, to enable users to do more in a desktop area. Modular interchangeable mat-type devices that interface with a capacitive mat display 38 support user selection of additional functionality as space allows. Expansion devices 374 connect to a work surface, such as capacitive mat display 38, via extendable rails 378 and interconnects to communicate power and information, such as a DisplayPort interface that daisychains with capacitive mat display 38 or other display devices. Expansion devices 376 selectively couple on any side surface of capacitive mat display 38 to provide interchangeable support for left and right handed people as well as to increase the depth of a desktop touch sensitive area. Expansion devices 374 drop into an expansion frame 376 that slides outward from capacitive mat display 38 on rails 378. Expansion devices 374 may be powered through the expanding rails, such as with contact springs or pogo pins that extend from rails 378. Alternatively, a communication port may provide communication of power and data, such as with the DisplayPort or USB standards. Expansion devices 376 have multiple different types of functionalities to enhance the immersed environment experience. These may include one or more of support for: wireless charging interchange between selected inductive charging standards like CHI or A4WP, an enlarged track pad surface, totem charging, speakers, physical buttons, pico projector, 3D depth camera, display, etc. . . . Different functionalities may be highlighted at an expansion device 374 with zone illumination, such as with LEDs to indicate if a device is charging or for aesthetic detail.

Figure 34:
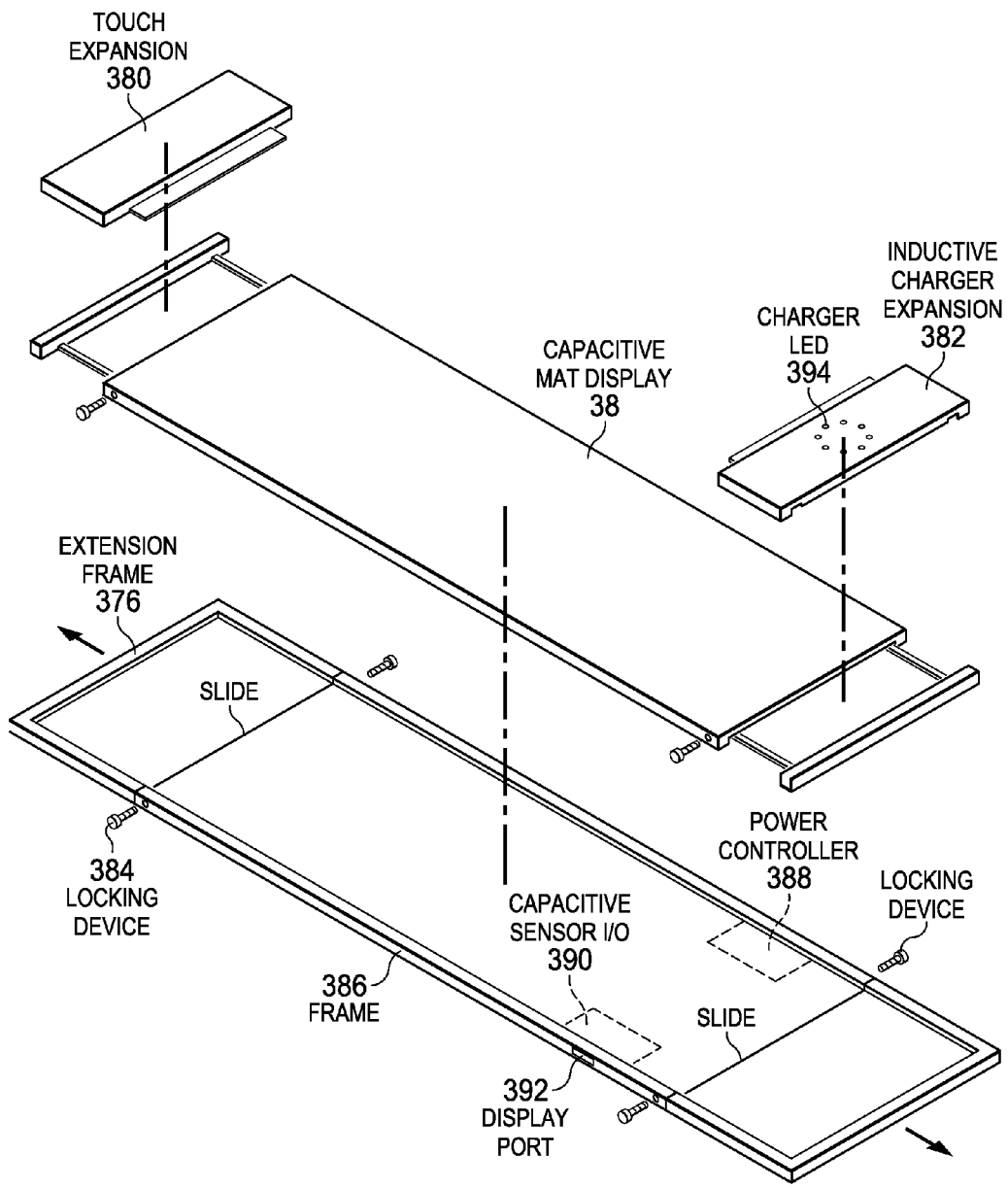
FIG. 34 depicts an upper perspective view of a blown-up view of a capacitive mat display 38 configured to accept interlocking modular expansion devices 374 to provide additional surface area for presenting information, accepting touch inputs and charging devices.

Referring now to FIG. 34, an upper perspective view depicts a blown-up view of a capacitive mat display 38 configured to accept interlocking modular expansion devices 374 to provide additional surface area for presenting information, accepting touch inputs and charging devices. In the example embodiment, a frame 386 surrounds the assembled mat devices to provide support and adjust to adapt to varying sized mat devices. Locking devices, such as screws 384, hold frame 386 in place to securely maintain mat devices in place on a desktop surface. Frame 386 comes with capacitive mat display 38 and expands outward as needed to adapt to expansion devices of varying size. In alternative embodiments, capacitive mat display 38 may include only a touch function supported by capacitive sensors without an integrated display or may include only an integrated display function without capacitive sensors. When an end user desires to add expansion modules, the end user loosens locking devices 384 and slide expansion frame 376 outward on rails 378 to make room for the desired expansion device. Once the expansion device is inserted into expansion frame 376, locking device 384 is tightened to hold the assembly in place. Frame 386 includes a power controller 388 that provides power to capacitive mat display 38 and to expansion devices added in expansion frame 376. Frame 386 also includes a capacitive sensor input/output device that provides touch control and display information to capacitive mat display 38.

In the example embodiment, a touch expansion device 380 is added to an extension frame 376 at the left side of capacitive mat display 38. Touches to touch expansion device are provide by a data interface to capacitive sensor input/output device 390 for communication to an information handling system. If a display device is included with touch expansion module 380, then display information is provided through a controller of capacitive sensor input/output device 390 to the added display device, such as by using a DisplayPort daisychain-type of interface connection. On the opposite side of capacitive mat display 38, an inductive charger expansion device 382 is coupled in an extension frame 376. Inductive charger expansion device 382 integrates an inductive charger that wirelessly powers peripherals placed on top of it, such as totems, mouse devices, mobile telephones, etc. . . . . Advantageously, visual information on capacitive mat display 38 provides direction to an end user for installing, removing and using expansion modules. In the example embodiment, charger LEDs 394 illuminate to indicate the correct charging location. Touch sensors located in inductive charger expansion device 382 manage the application of power to perform charging. In one embodiment, when an expansion device needs only power, power may be provide through a physical connection with rails 378. For example, only power is required where an expansion device provides only a charging functionality or when an expansion device communicates touch and display information directly to an information handling system, such as with a wireless interface.

Although the present invention has been described in detail, it should be understood that various changes, substitutions and alterations can be made hereto without departing from the spirit and scope of the invention as defined by the appended claims.

What is claimed is:

1. An information handling system comprising:
a processor operable to execute instructions to process information;
memory interfaced with the processor and operable to store the information;
a graphics system interfaced with the processor and memory, the graphics system operable to generate the visual images for presentation at one or more display devices;
a capacitive mat display device interfaced with the graphics system and operable to present the visual images, the capacitive mat disposed on a surface and including capacitive sensors operable to detect touches;
a totem disposed on the capacitive mat, the totem having a main body and at least one interactive portion, the interactive portion responding to end user manipulation to move relative to the main body; and
an input device controller interfaced with the capacitive mat display and operable to detect end user inputs by analyzing movement of the totem interactive portion relative to the totem main body, the input determined based upon the relative position of the interactive portion to the main body
wherein the totem further comprises:
an inner ring resting on the capacitive mat display device;
an outer ring rotationally coupled to the inner ring; and
one or more capacitive feet coupled to the outer ring and proximate to the capacitive mat display device, the input device controller detecting the relative position of the outer and inner rings by reference to a detected position of the one or more capacitive feet.

2. The information handling system of claim 1 further comprising:
a user interface module interfaced with the input device and operable to present a user interface on the capacitive mat display device based upon the location of the totem;
wherein the input device controller determines the end user inputs based at least in part upon the user interface presented by the user interface module.

3. The information handling system of claim 1 wherein the user interface controller selectively presents a volume scale proximate the totem and the input device controller detects end user volume inputs to adjust a speaker volume.

4. The information handling system of claim 1 further comprising a detent disposed between the first and second rings to provide mechanical feedback of rotation of rotation of the first and second rings relative to each other.

5. An information handling system comprising:
a processor operable to execute instructions to process information;
memory interfaced with the processor and operable to store the information;
a graphics system interfaced with the processor and memory, the graphics system operable to generate the visual images for presentation at one or more display devices;
a capacitive mat display device interfaced with the graphics system and operable to present the visual images, the capacitive mat disposed on a surface and including capacitive sensors operable to detect touches;
a totem disposed on the capacitive mat, the totem having a main body and at least one interactive portion, the interactive portion responding to end user manipulation to alter the totem interface with the capacitive mat relative to the main body;
an input device controller interfaced with the capacitive mat display and operable to detect end user inputs by analyzing the altering of the totem interface; and
a user interface module interfaced with the input device and operable to present a user interface on the capacitive mat display device based upon the location of the totem;
wherein the input device controller determines the end user inputs based at least in part upon the user interface presented by the user interface module; and
wherein the totem main body comprises:
an outer ring resting on the capacitive mat display device;
an inner ring rotationally coupled to the outer ring; and
one or more capacitive feet coupled to the inner ring and proximate to the capacitive mat display device, the input device controller detecting the relative positon of the outer and inner rings by reference to a detected position of the one or more capacitive feet.

6. The information handling system of claim 5 wherein the user interface controller selectively presents a volume scale proximate the totem and the input device controller detects end user volume inputs to adjust a speaker volume.

7. An information handling system comprising:
a processor operable to execute instructions to process information;
memory interfaced with the processor and operable to store the information;
a graphics system interfaced with the processor and memory, the graphics system operable to generate the visual images for presentation at one or more display devices;
a capacitive mat display device interfaced with the graphics system and operable to present the visual images, the capacitive mat disposed on a surface and including capacitive sensors operable to detect touches;
a totem disposed on the capacitive mat, the totem having a main body and at least one interactive portion, the interactive portion responding to end user manipulation to alter the totem interface with the capacitive mat relative to the main body;
an input device controller interfaced with the capacitive mat display and operable to detect end user inputs by analyzing the altering of the totem interface;
wherein the totem further comprises:
an inner ring resting on the capacitive mat display device;
an outer ring rotationally coupled to the inner ring; and
one or more capacitive feet coupled to the outer ring and proximate to the capacitive mat display device, the input device controller detecting the relative positon of the outer and inner rings by reference to a detected position of the one or more capacitive feet.

8. The information handling system of claim 7 further comprising a detent disposed between the first and second rings to provide mechanical feedback of rotation of rotation of the first and second rings relative to each other.

* * * * *